(12) United States Patent
Sakaguchi et al.

(10) Patent No.: US 9,524,561 B2
(45) Date of Patent: *Dec. 20, 2016

(54) IMAGE STABILIZATION DEVICE, IMAGE STABILIZATION METHOD, AND PROGRAM

(71) Applicant: Sony Corporation, Tokyo (JP)

(72) Inventors: Tatsumi Sakaguchi, Kanagawa (JP); Nobuhiro Ogawa, Tokyo (JP); Shinji Watanabe, Tokyo (JP)

(73) Assignee: Sony Corporation, Tokyo (JP)

( * ) Notice: Subject to any disclaimer, the term of this patent is extended or adjusted under 35 U.S.C. 154(b) by 266 days.

This patent is subject to a terminal disclaimer.

(21) Appl. No.: 14/285,925

(22) Filed: May 23, 2014

(65) Prior Publication Data

US 2014/0253600 A1 Sep. 11, 2014

Related U.S. Application Data

(63) Continuation of application No. 13/150,306, filed on Jun. 1, 2011, now Pat. No. 8,774,466.

(30) Foreign Application Priority Data

Jun. 8, 2010 (JP) .................................. 2010-131342

(51) Int. Cl.
G06K 9/40 (2006.01)
G06T 7/20 (2006.01)
G06T 11/00 (2006.01)

(52) U.S. Cl.
CPC .......... *G06T 7/20* (2013.01); *G06T 11/00* (2013.01)

(58) Field of Classification Search
None
See application file for complete search history.

(56) References Cited

U.S. PATENT DOCUMENTS

| | | | |
|---|---|---|---|
| 6,332,002 B1 * | 12/2001 | Lim | H04N 19/51 348/699 |
| 6,992,700 B1 * | 1/2006 | Sato | G03B 5/00 348/208.11 |
| 2003/0219146 A1 * | 11/2003 | Jepson | G06K 9/32 382/103 |
| 2008/0189661 A1 * | 8/2008 | Gundlach | G06F 3/017 715/863 |

(Continued)

FOREIGN PATENT DOCUMENTS

| | | | |
|---|---|---|---|
| JP | 2002-159026 A | 5/2002 | |
| JP | 2004-322727 A | 11/2004 | |

(Continued)

*Primary Examiner* — Jayesh A Patel
(74) *Attorney, Agent, or Firm* — Chip Law Group

(57) ABSTRACT

Techniques for image stabilization may include detecting motion of an apparatus configured to display image data, the image data comprising one or more frames, a first frame of the one or more frames comprising a plurality of layers. The plurality of layers may be processed to correct for the detected motion. The processing may comprise applying a different degree of motion correction to a first layer of the plurality of layers than to a second layer of the plurality of layers. Such techniques may be performed via an apparatus comprising a display control unit configured to cause the image data to be displayed, and a motion correction unit configured to perform the processing.

20 Claims, 28 Drawing Sheets

(EXAMPLE 1) CASE OF PORTABLE GAME MACHINE

| LAYER ATTRIBUTE INFORMATION | CONTROL CONTENT | WEIGHTING COEFFICIENT |
|---|---|---|
| GAME MAIN SCREEN | CORRECTION (FIXED RELATIVE TO USER) | 1.0 |
| OVERLAY SUCH AS SCORES | NO CORRECTION (FIXED RELATIVE TO DEVICE) | 0.0 |

(56) References Cited

U.S. PATENT DOCUMENTS

| | | | | |
|---|---|---|---|---|
| 2008/0267474 A1* | 10/2008 | Chen | ................... | G06T 5/005 |
| | | | | 382/130 |
| 2009/0201246 A1 | 8/2009 | Lee et al. | | |
| 2010/0216517 A1* | 8/2010 | Jung | ................... | G06F 1/1626 |
| | | | | 455/566 |
| 2010/0323762 A1* | 12/2010 | Sindhu | ................ | G06F 1/1613 |
| | | | | 455/566 |
| 2011/0179368 A1* | 7/2011 | King | ................ | G06F 3/04815 |
| | | | | 715/769 |

FOREIGN PATENT DOCUMENTS

| | | | |
|---|---|---|---|
| JP | 2004-356731 A | | 12/2004 |
| JP | 2006-145616 A | | 6/2006 |
| JP | 2006-208767 A | | 8/2006 |
| JP | 2006208767 A | * | 8/2006 |
| JP | 2011-257502 A | | 12/2011 |
| JP | 2011-257503 A | | 12/2011 |

* cited by examiner

FIG.5

(EXAMPLE 1) CASE OF PORTABLE GAME MACHINE

| LAYER ATTRIBUTE INFORMATION | CONTROL CONTENT | WEIGHTING COEFFICIENT |
|---|---|---|
| GAME MAIN SCREEN | CORRECTION (FIXED RELATIVE TO USER) | 1.0 |
| OVERLAY SUCH AS SCORES | NO CORRECTION (FIXED RELATIVE TO DEVICE) | 0.0 |

FIG.6

(EXAMPLE 2) CASE OF PORTABLE GAME MACHINE

| LAYER ATTRIBUTE INFORMATION | CONTROL CONTENT | WEIGHTING COEFFICIENT |
|---|---|---|
| GAME MAIN SCREEN | CORRECTION (FIXED RELATIVE TO USER) | 1.0 |
| OVERLAY SUCH AS SCORES | SMALL CORRECTION | 0.5 |
| OPERATION BUTTON OBJECT | NO CORRECTION (FIXED RELATIVE TO DEVICE) | 0.0 |

FIG.7

(EXAMPLE 3) CASE OF eBookReader

| LAYER ATTRIBUTE INFORMATION | CONTROL CONTENT | WEIGHTING COEFFICIENT |
|---|---|---|
| TEXT DISPLAY SCREEN | CORRECTION (FIXED RELATIVE TO USER) | 1.0 |
| OPERATION BUTTON OBJECT | NO CORRECTION (FIXED RELATIVE TO DEVICE) | 0.0 |

EXAMPLE OF FIR FILTER HAVING LOW-PASS CHARACTERISTIC

○ Reference pixel
⊘ Target pixel output_pixel=($a_{00}$ (1-HorPos)+$a_{10}$ HorPos) (1-VerPos)
+($a_{10}$ (1-VerPos)+$a_{11}$ HorPos) VerPos)

FIG.15

(EXAMPLE 1) CASE OF PORTABLE GAME MACHINE

| LAYER ATTRIBUTE INFORMATION | CONTROL CONTENT | ATTENUATION COEFFICIENT |
|---|---|---|
| GAME MAIN SCREEN | CORRECTION (FIXED RELATIVE TO USER) | 1.0 |
| OVERLAY SUCH AS SCORES | NO CORRECTION (FIXED RELATIVE TO DEVICE) | 0.0 |

FIG.16

(EXAMPLE 2) CASE OF PORTABLE GAME MACHINE

| LAYER ATTRIBUTE INFORMATION | CONTROL CONTENT | ATTENUATION COEFFICIENT |
|---|---|---|
| GAME MAIN SCREEN | CORRECTION (FIXED RELATIVE TO USER) | 1.0 |
| OVERLAY SUCH AS SCORES | SMALL CORRECTION | 0.5 |
| OPERATION BUTTON OBJECT | NO CORRECTION (FIXED RELATIVE TO DEVICE) | 0.0 |

FIG.17

(EXAMPLE 3) CASE OF eBookReader

| LAYER ATTRIBUTE INFORMATION | CONTROL CONTENT | ATTENUATION COEFFICIENT |
|---|---|---|
| TEXT DISPLAY SCREEN | CORRECTION (FIXED RELATIVE TO USER) | 1.0 |
| OPERATION BUTTON OBJECT | NO CORRECTION (FIXED RELATIVE TO DEVICE) | 0.0 |

FIG.19
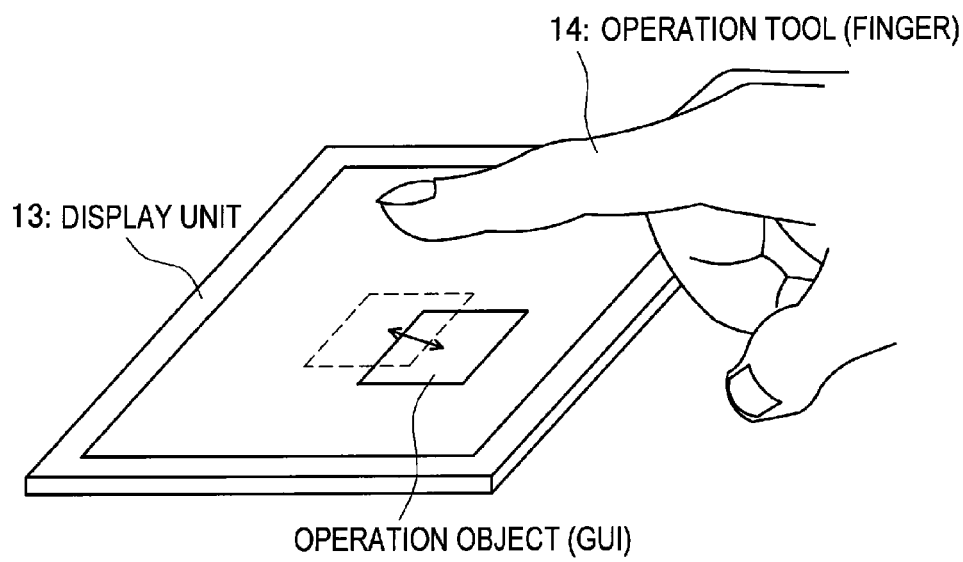
(INTO PROXIMITY)
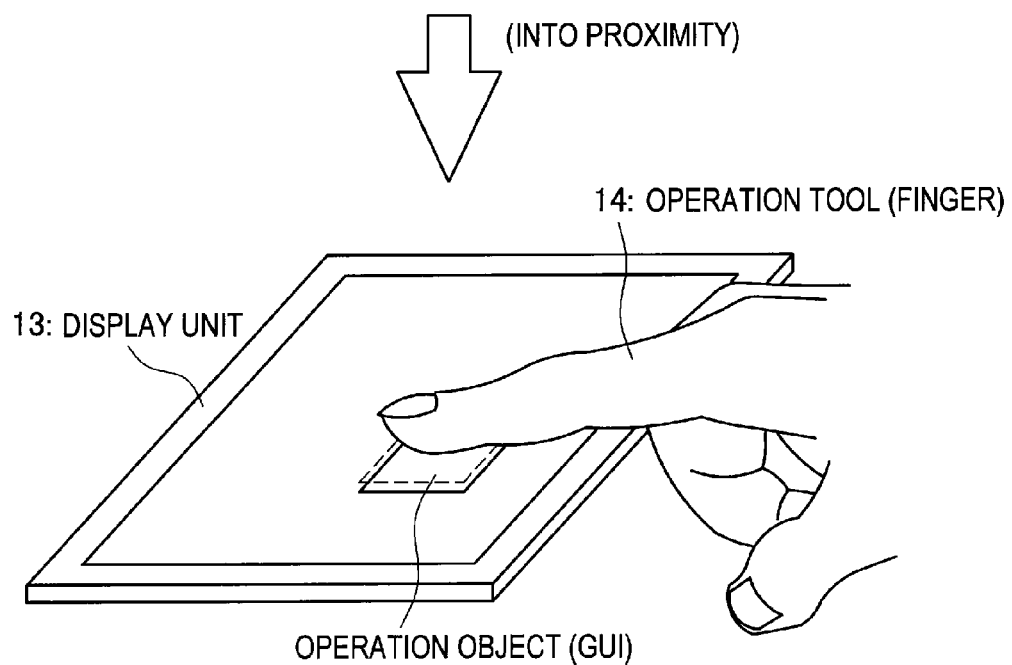

STATE WHERE VANISHING POINT STAYS STILL RELATIVE TO USER

STATE WHERE FOREMOST SCREEN STAYS STILL RELATIVE TO USER

IMAGE STABILIZATION DEVICE, IMAGE STABILIZATION METHOD, AND PROGRAM

CROSS-REFERENCE TO RELATED APPLICATIONS/INCORPORATION BY REFERENCE

This application is a continuation application of U.S. patent application Ser. No. 13/150,306, filed on Jun. 1, 2011, now a U.S. Pat. No. 8,774,466, which claims priority from Japanese Patent Application JP 2010-131342 filed in the Japan Patent Office on Jun. 8, 2010. Each of the above referenced applications is hereby incorporated by reference in its entirety.

BACKGROUND

Field

Some embodiments described in the present application relate to an image stabilization device, an image stabilization method, and a program.

Description of the Related Art

In recent years, small electronic appliances (hereinafter, portable appliances) such as a mobile phone, a portable game machine, a portable information terminal, a notebook computer (hereinafter, notebook PC), a portable music player, a digital video camera, a digital still camera (hereinafter, image pickup device), and the like have come to be widely used. These portable appliances are used in various places. For example, users are seen to be using the portable appliances on a vehicle while moving, on a street corner, in a waiting room in an office building, in the living room at home, and the like.

As such, use scenes are becoming more various as the portable appliances are made smaller and their portability is increased. However, although the effect of increase in the portability increases the convenience of carrying, it does not increase the applicability to various use scenes. For example, although a portable appliance is small and thus is easy to carry onto a vehicle, a quick and accurate operation thereof is difficult on a bouncing vehicle. Accordingly, companies manufacturing portable appliances are refining, for example, structures of holding portions of portable appliances or the forms of operation means.

Furthermore, there is also an issue that it is difficult to correctly perceive images, letters, or the like displayed on display means of a portable appliance while on a bouncing vehicle or while walking. That is, images, letters, or the like displayed on the display means are blurred due to the shaking of the portable appliance, thus making it difficult to see the displayed contents. Such blurring of images, letters, or the like is very tiring to the optic nerve of a user. Thus, a technology has been developed that moves images, letters, or the like in a direction that cancels the shaking of a portable appliance, thereby reducing the blurring of the images, letters, or the like.

With respect to the technology above, JP-A-2000-221954 discloses a technology for detecting shaking of a portable appliance and moving a display image in a direction that cancels the shaking. The patent document also discloses a technology for truncating a region not displayed on the screen when the display image is moved. Furthermore, the patent document discloses a technology for detecting shaking of the portable appliance by using an accelerometer. Here, the technology disclosed in the patent document is for calculating shaking of a phase opposite to the phase of the shaking of a portable appliance and adding this shaking to cancel the shaking of the portable appliance.

SUMMARY

However, a delay occurs between the timing of occurrence of shaking of a portable appliance and the timing of motion compensation of a display image due to computational processing or the like. Thus, in the case the shaking of the portable appliance is weak, the phase of the shaking of the portable appliance and the phase of shaking given to the display image will be approximately opposite, but in the case the shaking of the portable appliance is intense, the phases of the shaking will not be opposite. In some cases, the phases of the shaking are intensified by each other. As a result, shaking of the display image seen from the user's point of view is increased and will be even more tiring to the optic nerve of the user.

For example, when using the portable appliance on a bouncing vehicle, a fine shaking is likely to occur on the portable appliance. Accordingly, if the technology of the patent document described above is applied, discrepancy between phases occurs frequently between the shaking of the portable appliance and the shaking given to the display image to cancel the above-mentioned shaking, and thus the shaking of the display image relative to the user's point of view is even more increased. Furthermore, eyes of a human have a function of following the motion of a viewing target. Thus, even if the display image is not completely still relative to the user's point of view, the display image can be correctly viewed.

In light of the foregoing, it is desirable to provide an image stabilization device, an image stabilization method, and a program which are novel and improved, and which are capable of reducing shaking of a display image relative to a user's point of view on a per-layer basis in the case shaking of a portable appliance occurs, thereby further reducing the fatigue of the user.

According to the embodiments described above, it is possible to reduce shaking of a display image relative to a user's point of view on a per-layer basis in the case shaking of a portable appliance occurs, thereby further reducing the fatigue of the user. In some embodiments, the image stabilization may comprise detecting motion of an apparatus configured to display image data, and processing the image data to correct for the detected motion. In some embodiments, the processing may comprise applying motion correction to layers of the image data, by moving the layers in a direction opposing the detected motion. In some embodiments, different degrees of motion correction may be applied to different layers and/or to different types of layers.

BRIEF DESCRIPTION OF THE DRAWINGS

FIG. 5 is an explanatory diagram showing a determination method of a correction amount for each layer used for a shake cancelling method according to the embodiment;

FIG. 6 is an explanatory diagram showing a determination method of a correction amount for each layer used for a shake cancelling method according to the embodiment;

FIG. 7 is an explanatory diagram showing a determination method of a correction amount for each layer used for a shake cancelling method according to the embodiment;

FIG. 15 is an explanatory diagram showing a determination method of a correction amount for each layer used for a shake cancelling method according to the embodiment;

FIG. 16 is an explanatory diagram showing a determination method of a correction amount for each layer used for a shake cancelling method according to the embodiment;

FIG. 17 is an explanatory diagram showing a determination method of a correction amount for each layer used for a shake cancelling method according to the embodiment;

FIG. 19 is an explanatory diagram showing a shake cancelling method according to the embodiment;

DETAILED DESCRIPTION OF THE EMBODIMENT(S)

Figure 1:
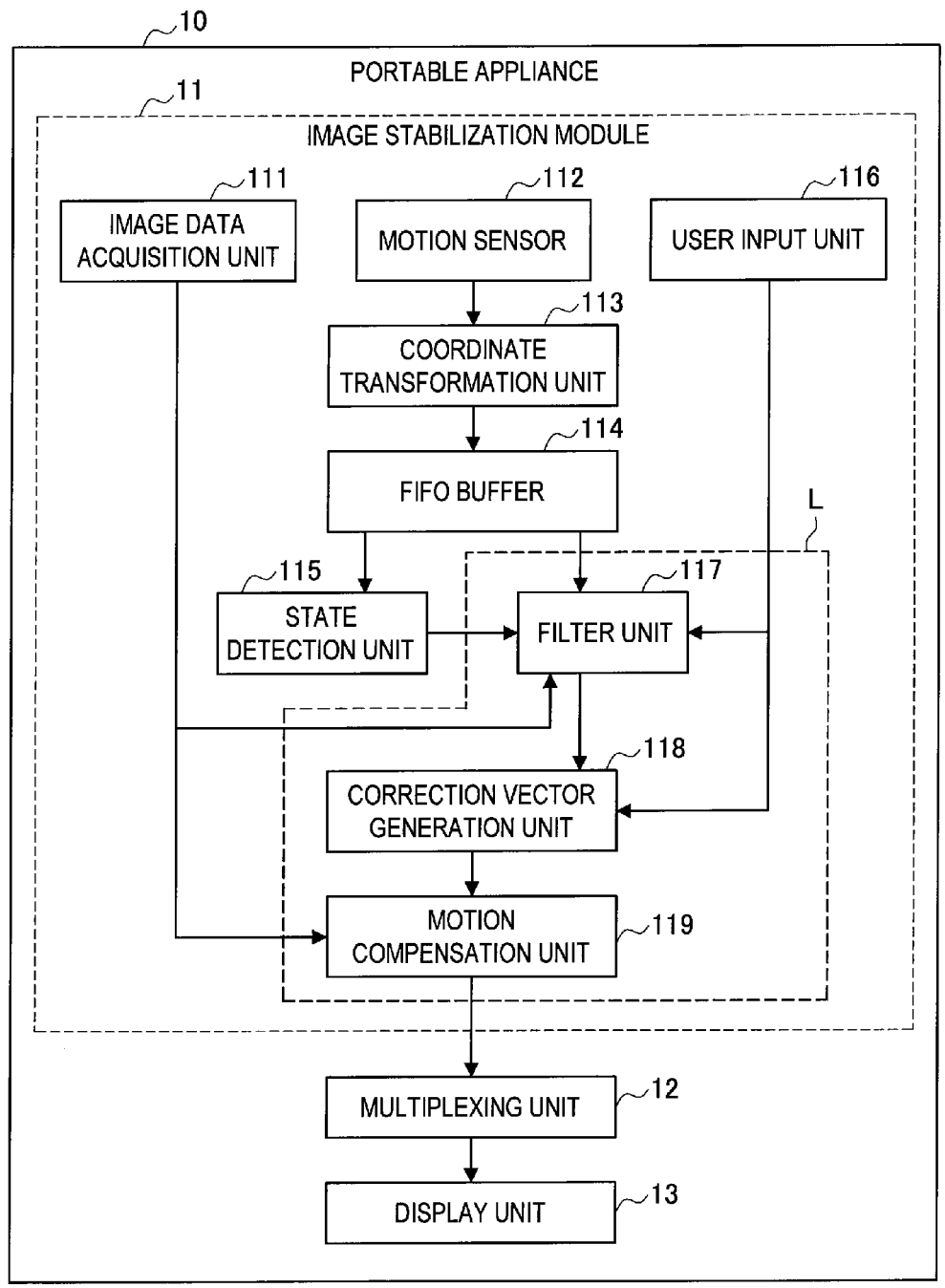
FIG. 1 is an explanatory diagram showing a functional configuration of a portable appliance according to a first embodiment.

Hereinafter, preferred embodiments will be described in detail with reference to the appended drawings. Note that, in this specification and the appended drawings, structural elements that have substantially the same function and structure are denoted with the same reference numerals, and repeated explanation of these structural elements is omitted.

<Flow of Description>

The flow of description of embodiments described below will be briefly mentioned here.

First, a functional configuration of a portable appliance 10 according to a first embodiment will be described with reference to FIG. 1. Next, an operation of a state detection unit 115 according to the embodiment will be described with reference to FIG. 2. Then, a calculation method of applied cancellation strength according to the embodiment will be described with reference to FIGS. 3 to 7.

Next, an operation of a filter unit 117 according to the embodiment will be described with reference to FIG. 8. Then, a calculation method of a correction amount used at the time of application of shake cancelling according to the embodiment will be described with reference to FIGS. 9 and 10. At the same time, an example of a filter used at the time of application of the shake cancelling according to the embodiment will be described with reference to FIG. 11. Also, a motion compensation method according to the embodiment will be described with reference to FIG. 12. Furthermore, a layer multiplexing method according to the embodiment will be described with reference to FIG. 13.

Next, an operation of a filter unit 117 according to a modified example of the embodiment will be described with reference to FIG. 14. Then, a calculation method of a correction amount used at the time of application of shake cancelling according to the embodiment will be described with reference to FIGS. 15 to 17.

Next, a functional configuration of a portable appliance 10 according to a second embodiment will be described with reference to FIG. 18. Then, a determination method of filter strength according to the embodiment will be described with reference to FIGS. 19 to 21. Then, a functional configuration of a portable appliance 10 according to a third embodiment will be described with reference to FIG. 22. Then, a method of applying shake cancelling to three-dimensional computer graphics (hereinafter, 3DCG) according to the embodiment will be described with reference to FIGS. 23 to 25.

Then, a configuration of hardware capable of realizing the functions of the portable appliances according to the first to third embodiments will be described with reference to FIG. 28. Lastly, the technical idea of the present embodiment will be summarized and operational effects obtained by the technical idea will be briefly described.

(Description Items)

1: First Embodiment
   1-1: Functional Configuration of Portable Appliance 10
   1-2: Operation of State Detection Unit 115
      1-2-1: Flow of Processes
      1-2-2: Calculation Method of Shake Coefficient
      1-2-3: Calculation Method of Applied Cancellation Strength
   1-3: Operation of Filter Unit 117
      1-3-1: Flow of Processes
      1-3-2: Calculation of Prediction Value
      1-3-3: Calculation of Correction Amount
   1-4: (Modified Example) Operation of Filter Unit 117
      1-4-1: Flow of Processes
      1-4-2: Attenuation of Correction Amount
2: Second Embodiment
   2-1: Functional Configuration of Portable Appliance 10
   2-2: Adjustment Method of Applied Cancellation Strength 3: Third Embodiment
   3-1: Functional Configuration of Portable Appliance 10
   3-2: Adjustment Method of Correction Amount
4: Hardware Configuration
5: Summary <1: First Embodiment>

A first embodiment will be described. The present embodiment relates to a method of reducing shaking of a display image occurring in relation to a user's point of view in a situation where shaking is caused on a portable appliance 10. Note that this method is not for "stilling" a display image in relation to a user's point of view, but for "reducing" the shaking of the display image to reduce the fatigue of the user.

[1-1: Functional Configuration of Portable Appliance 10]

First, a functional configuration of the portable appliance 10 according to the present embodiment will be described with reference to FIG. 1. FIG. 1 is an explanatory diagram showing a functional configuration of the portable appliance 10 according to the present embodiment.

As shown in FIG. 1, the portable appliance 10 mainly includes an image stabilization module 11, a multiplexing unit 12, and a display unit 13. The image stabilization module 11 is means for reducing shaking of a display image relative to a user's point of view. The multiplexing unit 12 is means for multiplexing a plurality of layers and creating a display image. The display unit 13 is means for displaying the display image created by the multiplexing unit 12. The feature of the portable appliance 10 according to the present embodiment lies mainly in the configuration of the image stabilization module 11. Thus, in the following, the configuration of the image stabilization module 11 will be described in greater detail.

As shown in FIG. 1, the image stabilization module 11 mainly includes an image data acquisition unit 111, a motion sensor 112, a coordinate transformation unit 113, a FIFO buffer 114, and a state detection unit 115. Furthermore, the image stabilization module 11 includes a user input unit 116, a filter unit 117, a correction vector generation unit 118, and a motion compensation unit 119. Additionally, a block L including the filter unit 117, the correction vector generation unit 118, and the motion compensation unit 119 performs processing on a per-layer basis.

(Image Data Acquisition Unit 111)

The image data acquisition unit 111 is means for acquiring image data. For example, the image data acquisition unit 111 acquires a time-series frame group. Incidentally, frames forming this frame group may be placed at constant time intervals (fixed frame intervals) or may be placed at arbitrary time intervals (variable frame intervals). Also, each frame is configured from a plurality of layers.

Additionally, a number indicating the position in an overlaying order and use information are associated with each layer. For example, a number 0 is associated with the top layer, and a number 1 is associated with the next layer. Also, the use information is for specifying the use of an image displayed on a layer, such as a menu screen, a video screen, an operation object, or the like. Image data acquired by the image data acquisition unit 111 is input to the motion compensation unit 119. In the following explanation, each frame or each layer may be sometimes called image data.

(Motion Sensor 112)

The motion sensor 112 is means for detecting the motion of the portable appliance 10. For example, the motion sensor 112 is configured from a six-axis sensor, a two-axis sensor, or the like. Additionally, the six-axis sensor is a sensor capable of detecting acceleration along three orthogonal axis directions and rotation around three orthogonal axes. Also, the two-axis sensor is a sensor capable of detecting acceleration along two orthogonal axis directions. In the following explanation, data showing motion detected by the motion sensor 112 will be called motion data.

The motion sensor 112 outputs the motion data at a predetermined sampling cycle. This sampling cycle is not related to the frame rate of the image data. Also, this sampling rate may be a fixed rate or may be a variable rate. However, according to the sampling theorem, a sampling rate two times or more the frequency for moving the image data to cancel the shaking of the portable appliance 10 will be necessary. Also, the motion data output from the motion sensor 112 is input to the coordinate transformation unit 113.

(Coordinate Transformation Unit 113)

The coordinate transformation unit 113 is means for transforming the motion data input from the motion sensor 112 into a data format that can be used by the filter unit 117 in the latter stage. For example, in the case the motion sensor 112 is a six-axis sensor, motion data including gravitational acceleration is obtained. That is, the motion data input to the coordinate transformation unit 113 is not motion data purely expressing the motion of the portable appliance 10. Accordingly, the coordinate transformation unit 113 removes the component of the gravitational acceleration from the motion data input from the motion sensor 112, and generates motion data expressing the motion of the portable appliance 10. The motion data generated by the coordinate transformation unit 113 is input to the FIFO buffer 114.

(FIFO Buffer 114)

The FIFO buffer 114 is means for accumulating the motion data input by the coordinate transformation unit 113. Additionally, when the next motion data is input in a state where a predetermined accumulation amount is full, the FIFO buffer 114 discards the oldest motion data. This accumulation amount is set to a data amount for one second (for example, thirty frames in the case the frame rate is 30 fps), for example. The motion data accumulated in the FIFO buffer 114 is read by the state detection unit 115 and the filter unit 117.

(State Detection Unit 115)

The state detection unit 115 is means for calculating applied cancellation strength. Additionally, the applied cancellation strength here is a value indicating the strength of cancellation of the shaking of image data relative to a user's point of view. First, the state detection unit 115 acquires motion data $(D_t, \ldots, D_{t+n})$ from the FIFO buffer 114. Additionally, $D_t$ is motion data detected at time t. The state detection unit 115 which has acquired the motion data $(D_t, \ldots, D_{t+n})$ inputs the motion data $(D_t, \ldots, D_{t+n})$ in a predetermined function f and calculates a shake coefficient s, as shown in formula (1) below.

[Equation 1]

$$S = f(D_t, \ldots, D_{t+n}) \qquad (1)$$

This function f is a transformation formula for quantifying the intensity of the motion expressed by the motion data $(D_t, \ldots, D_{t+n})$. Also, the shake coefficient s is a numerical value expressing the intensity of the motion expressed by the motion data $(D_t, \ldots, D_{t+n})$. For example, the above-described function f is a transformation formula for orthogonally transforming the motion data $(D_t, \ldots, D_{t+n})$ and outputting a maximum amplitude value in a predetermined frequency domain. Additionally, as an example of the orthogonal transformation, Fourier transform or the like may be taken.

Figure 3:
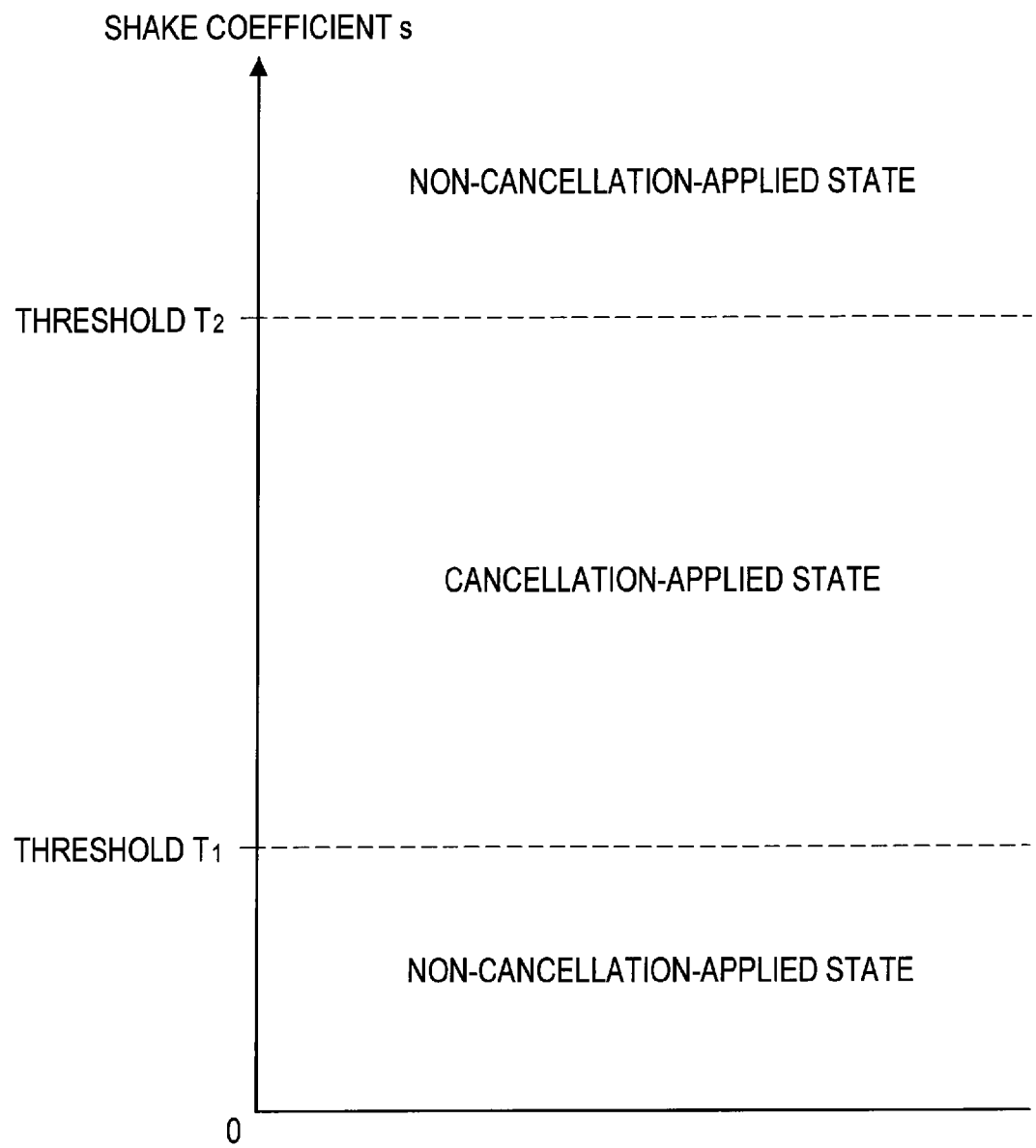
FIG. 3 is an explanatory diagram showing a calculation method of applied cancellation strength according to the embodiment.

The state detection unit 115 which has calculated the shake coefficient s in the above manner calculates applied cancellation strength based on the shake coefficient s. For example, in the case only two states, namely a case where cancellation is to be applied and a case where cancellation is not to be applied, are to be taken into account, the state detection unit 115 calculates the applied cancellation strength based on comparison results between the shake coefficient s and two thresholds $T_1$ and $T_2$, as shown in FIG. 3. Additionally, the applied cancellation strength is 1.0 in the case of a cancellation-applied state. On the other hand, the applied cancellation strength is 0.0 in the case of a non-cancellation-applied state.

As described above, a case where the shake coefficient s is large is a state where the shaking of the portable appliance 10 is intense. In the case the shaking of the portable appliance 10 is intense, if image data is moved in a direction of cancelling the shaking, the shaking of the image data relative to a user's point of view is not reduced, but on the contrary, the shaking of the image data relative to the user's point of view is possibly increased. Furthermore, if the image data is greatly moved, much of the image area will move out of the screen and a non-displayed area of the image data will be too large. Thus, cancellation of shaking is preferably not applied in the case the shaking of the portable appliance 10 is intense.

On the other hand, a case where the shake coefficient s is small is a state where the shaking of the portable appliance 10 is slow. In the case the shaking of the portable appliance 10 is slow, a user can easily follow the motion of the image data. Thus, no cancellation is necessary in the case the shake coefficient s is small.

For the above reason, thresholds $T_1$ and $T_2$ are preferably determined as follows. For example, threshold $T_1$ is preferably determined such that the range of the shaking indicated by the shake coefficient s is about 1% of the screen size. That is, threshold $T_1$ is preferably determined such that the shaking of the image data relative to the user's point of view will be a negligible value. On the other hand, with respect to threshold $T_2$, the range of the shaking indicated by the shake coefficient s is preferably about 10% of the screen size. That is, it is preferably determined to be a value according to which the effect of cancellation can be obtained and the non-displayed area is not too large in the case cancellation has been applied.

Additionally, the numerical values of thresholds $T_1$ and $T_2$ are not limited to the examples described above. Also, thresholds $T_1$ and $T_2$ may be fixed values, or they may be variable.

The determination method of the applied cancellation strength described above takes into account only two states, namely a state where cancellation is to be applied and a state where cancellation is not to be applied. In contrast, a method of successively determining the applied cancellation strengths according to the shake coefficients s is also conceivable.

Figure 4:
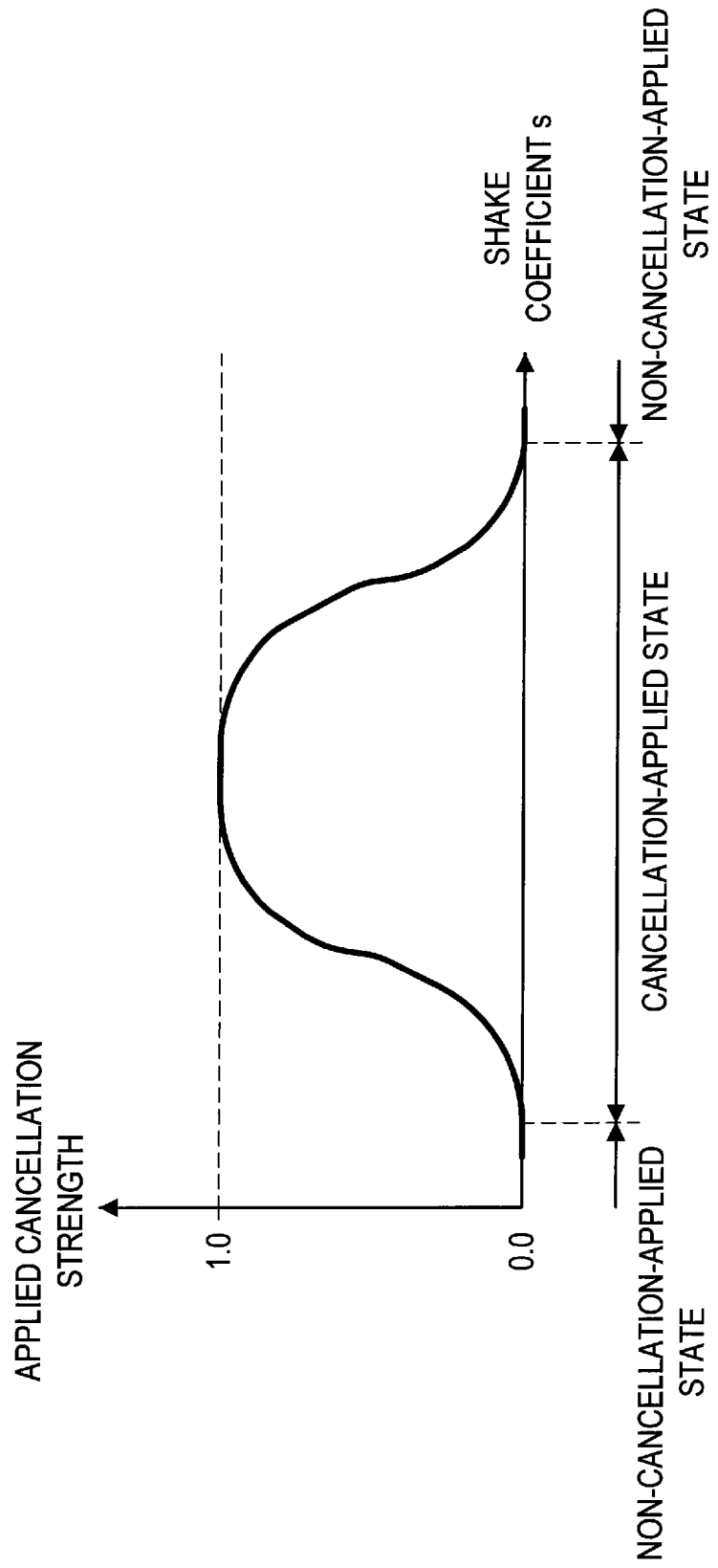
FIG. 4 is an explanatory diagram showing a calculation method of the applied cancellation strength according to the embodiment.

For example, the applied cancellation strength can be defined by a real number between 0.0 to 1.0, as shown in FIG. 4. In this case, the non-cancellation-applied state is defined to be a state where the applied cancellation strength is 0.0. Furthermore, the characteristic of the applied cancellation strength is expressed by a curved line as shown in FIG. 4 or other curved lines or linear lines. Of course, the form of the characteristic determining the applied cancellation strength according to the shake coefficient s is not limited to the example in FIG. 4. Additionally, in the following, an explanation will be given assuming a case where applied cancellation strength defined by successive values is used.

As described above, the state detection unit 115 calculates the shake coefficient s for each axis of the motion sensor 112 by using the motion data ($D_t, \ldots, D_{t+n}$) read from the FIFO buffer 114, and calculates the applied cancellation strength based on the shake coefficient s. The applied cancellation strength calculated by the state detection unit 115 in this manner is input to the filter unit 117.

(User Input Unit 116)

The user input unit 116 is means for a user to input various types of data.

(Filter Unit 117)

The filter unit 117 is means for calculating the amount of moving image data to cancel the shaking of the image data relative to a user's point of view (hereinafter, correction amount). First, the filter unit 117 reads the motion data ($D_t, \ldots, D_{t+n}$) from the FIFO buffer 114, and calculates motion data $D_{t+n+1}$ at a display time point t+n+1 of a next frame. At this time, the motion data $D_{t+n+1}$ (prediction value) is calculated for each axis of the motion sensor 112.

Figure 9:
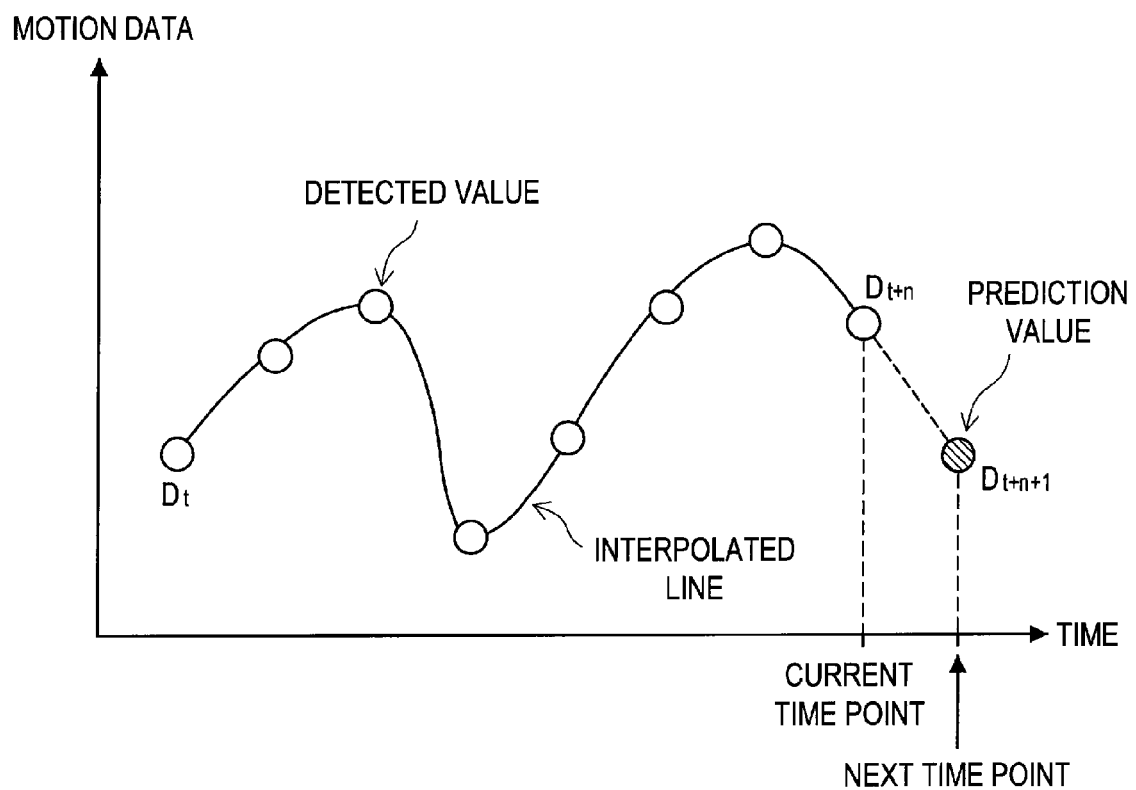
FIG. 9 is an explanatory diagram showing a calculation method of a correction amount used at the time of application of shake cancelling according to the embodiment.

Additionally, the calculation method of the motion data $D_{t+n+1}$ may be a linear prediction method using two adjacent samples ($D_{t+n-1}, D_{t+n}$) as shown in FIG. 9 or a prediction method using a spline curve of the motion data ($D_t, \ldots, D_{t+n}$), for example.

Then, the filter unit 117 applies motion data ($D_t, \ldots, D_{t+n}, D_{t+n+1}$) including a prediction value to a predetermined filter. As this filter, a filter having a low-pass characteristic or a band-pass characteristic, such as an averaging filter, a bilateral filter or the like, can be used. For example, a FIR filter shown in FIG. 11 can be used. Additionally, the filter unit 117 changes the tap length of the filter according to the applied cancellation strength input by the state detection unit 115, filter strength input by a user via the user input unit 116, and attribute information of each layer (see FIGS. 5 to 7).

For example, in the case the applied cancellation strength is strong, the filter unit 117 increases the tap length of the filter. On the other hand, in the case the applied cancellation strength is weak, the filter unit 117 reduces the tap length of the filter. Also, in the case the filter strength input by a user is strong, the filter unit 117 increases the tap length of the filter. On the other hand, in the case the filter strength input by a user is weak, the filter unit 117 reduces the tap length of the filter. For example, the filter unit 117 decides a standard tap length to be thirty samples or the like, and increases or reduces, according to the applied cancellation strength, the tap length in relation to the standard tap length.

Furthermore, the filter unit 117 adjusts the tap length of the filter according to the attribute information of each layer. Attribute information of each layer acquired by the image data acquisition unit 111 is input to the filter unit 117. This attribute information is information indicating the use of a layer.

In some embodiments, the degree of motion correction to be applied to a layer may be determined based on its layer type, and different degrees of motion correction may be applied to layers of different types. For example, as shown in FIG. 5, in the case the portable appliance 10 is a portable game machine, a layer whose use is for "main screen of game" and a layer whose use is for "overlay such as scores" are included in the image data. In the case of the main screen of a game, it is considered that application of cancellation will contribute to the improvement of a user's view, and thus a weighting coefficient of 1.0 is set in this case. The applied cancellation strength is multiplied by this weighting coefficient. Accordingly, the tap length of the filter is set to be longer as the weighting coefficient is larger. On the other hand, in the case of display of an overlay such as scores, it is considered that non-application of cancellation will contribute to the improvement of the user's view, and thus a weighting coefficient of 0.0 is set in this case.

Furthermore, an operation button object is sometimes included. In this case, if an operation button moves relative to the portable appliance 10 due to application of cancellation, the operability is assumed to be reduced. Thus, as shown in FIG. 6, a weighting coefficient of 0.0 is set for a layer whose use is for "operation button object," thereby preventing application of cancellation. Furthermore, in the case the portable appliance 10 is a terminal for displaying text, such as an eBook Reader, it is considered that application of cancellation to a layer whose use is for "text display screen" will contribute to the improvement of the user's view. Thus, as shown in FIG. 7, a weighting coefficient of 1.0 is set to the layer whose use is for the text display screen.

As described, by performing application control of cancellation according to the use of a layer, a user's operability or view can be improved. The attribute information of a layer and a weighting coefficient according to each piece of attribute information are set in advance as illustrated in FIGS. 5 to 7, and the filter unit 117 multiplies the applied cancellation strength by the weighting coefficient and determines the tap length of the filter according to the multiplication result. Thus, different filters (e.g., with different numbers of taps) may be applied to different layers and/or to layers of different types. The application control of cancellation according to the use of a layer is realized by this processing.

Figure 10:
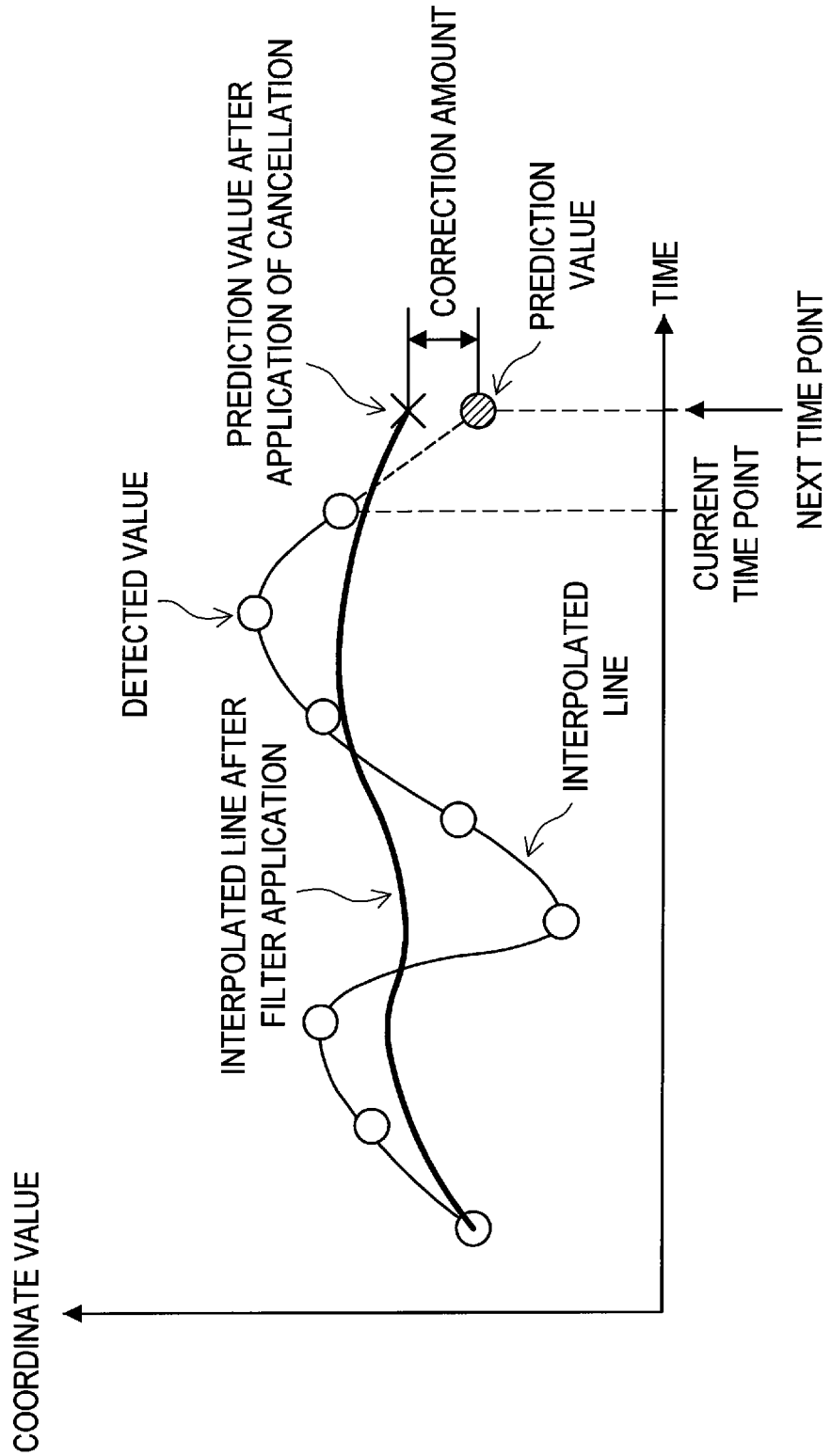
FIG. 10 is an explanatory diagram showing a calculation method of a correction amount used at the time of application of shake cancelling according to the embodiment.
Figure 11:
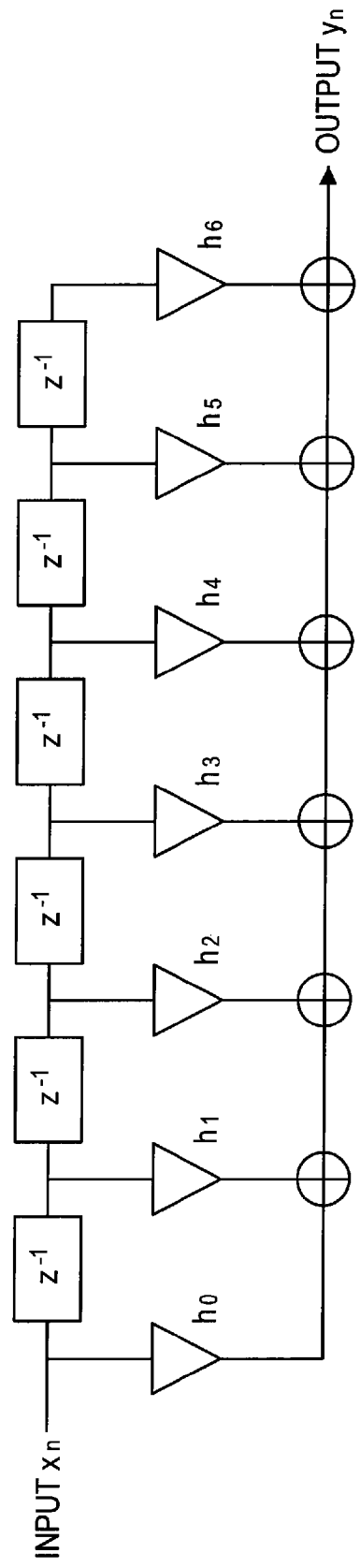
FIG. 11 is an explanatory diagram showing an example circuit configuration of a FIR filter.

Now, the output value of the filter to which the motion data ($D_t$, . . . , $D_{t+n}$, $D_{t+n+1}$) including a prediction value is applied will be as the interpolated line after filter application shown in FIG. 10. Additionally, in the following explanation, the values on the interpolated line after filter application will be referred to as filter applied data. The filter unit 117 which has obtained the filter applied data sets the difference between the filter applied data at the display time point t+n+1 of a next frame and prediction value $D_{t+n+1}$ as the correction amount. Also, the filter unit 117 converts the unit of the correction amount from the unit of motion data (inch or the like) to the unit of image data (pixel). Correction amount for each axis is obtained in the unit of image data in this manner. Thus, as a different weighting coefficient in some embodiments may be applied to the applied cancellation strength to determine the tap length for different layers and/or layer types, the filters with different tap lengths may produce different output values, resulting in different correction amounts for different layers and/or layer types.

Next, the filter unit 117 calculates a maximum value of distance image data can move on the screen (hereinafter, maximum screen movement amount). The maximum screen movement amount is calculated from the relationship between a protected area set for the image data and the position of an image frame. The protected area here is an area set in advance as an area that is definitely to be displayed even if cancellation is applied. In this case, the maximum screen movement amount is determined according to a distance between the boundary of the protected area and the image frame.

After calculating the maximum screen movement amount in the manner described above, the filter unit 117 compares the correction amount and the maximum screen movement amount with respect to the direction of each axis. Then, in the case the correction amount is larger than the maximum screen movement amount, the filter unit 117 re-sets the correction amount so that the correction amount will be the maximum screen movement amount. With the correction amount being re-set in this manner, the protected area will definitely be displayed within the screen even if the image data is moved based on the correction amount. Additionally, in the case there is no protected area or in the case the maximum screen movement amount is determined by some other restriction, a correction amount based on the maximum screen movement amount is re-set as necessary.

As described above, the correction amount calculated by the filter unit 117 or the correction amount re-set based on the maximum screen movement amount is input to the correction vector generation unit 118. Incidentally, in the above explanation, expressions, correction amount of image data and maximum screen movement amount of image data, are used. Here, the processing described above is performed for each layer. That is, the protected area is set for each layer or the maximum screen movement amount is calculated for each layer, and the correction amount is set for each layer. Then, the correction amount set for each layer is input from the filter unit 117 to the correction vector generation unit 118.

(Correction Vector Generation Unit 118, Motion Compensation Unit 119)

The correction vector generation unit 118 is means for generating a correction vector for correcting the position of a layer by using a correction amount input from the filter unit 117. This correction vector is transformation means for transforming a layer before application of cancellation into a layer after application of cancellation by motion compensation. When taking the coordinate of each pixel forming the layer before application of cancellation as X and the coordinate of each pixel after application of cancellation as X', the coordinate X' is expressed by using the formulae (2) to (7) below. Incidentally, parameters (h, v, θ, p, $h_c$, $v_c$) are parameters related to the correction amount for each axis input by the filter unit 117.

[Equation 2]

$$X' = C^{-1}P^{-1}MPCX \quad (2)$$

$$X = \begin{pmatrix} x \\ y \\ 1 \end{pmatrix} \quad (3)$$

$$X' = \begin{pmatrix} x' \\ y' \\ 1 \end{pmatrix} \quad (4)$$

$$M = \begin{pmatrix} 1 & 0 & h \\ 0 & 1 & v \\ 0 & 0 & 1 \end{pmatrix} \begin{pmatrix} \cos\theta & -\sin\theta & 0 \\ \sin\theta & \cos\theta & 0 \\ 0 & 0 & 1 \end{pmatrix} \quad (5)$$

$$P = \begin{pmatrix} p & 0 & 0 \\ 0 & 1 & 0 \\ 0 & 0 & 1 \end{pmatrix} \quad (6)$$

$$C = \begin{pmatrix} 1 & 0 & -h_c \\ 0 & 1 & -v_c \\ 0 & 0 & 1 \end{pmatrix} \quad (7)$$

Figure 12:
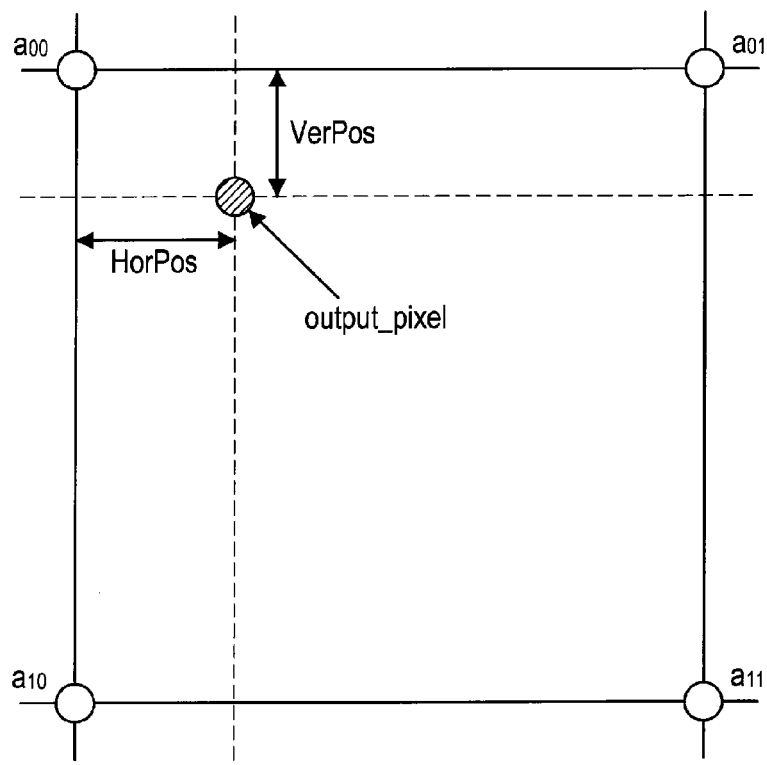
FIG. 12 is an explanatory diagram showing a motion compensation method according to the embodiment.

The correction vector generation unit 118 calculates, by using the formulae (2) to (7) above, the parameters (h, v, θ, $p$, $h_c$, $v_c$) from the correction amount for each axis input by the filter unit 117, and inputs a correction matrix V expressed by formula (8) below to the motion compensation unit 119. The motion compensation unit 119 performs motion compensation of a layer by using the correction matrix V input by the correction vector generation unit 118. For example, as shown in FIG. 12, the motion compensation unit 119 performs motion compensation by using linear interpolation and with accuracy below an integer pixel. A layer for which motion compensation has been performed by the motion compensation unit 119 is input to the multiplexing unit 12.

[Equation 3]

$$V = C^{-1} P^{-1} MPC \qquad (8)$$

Figure 13:
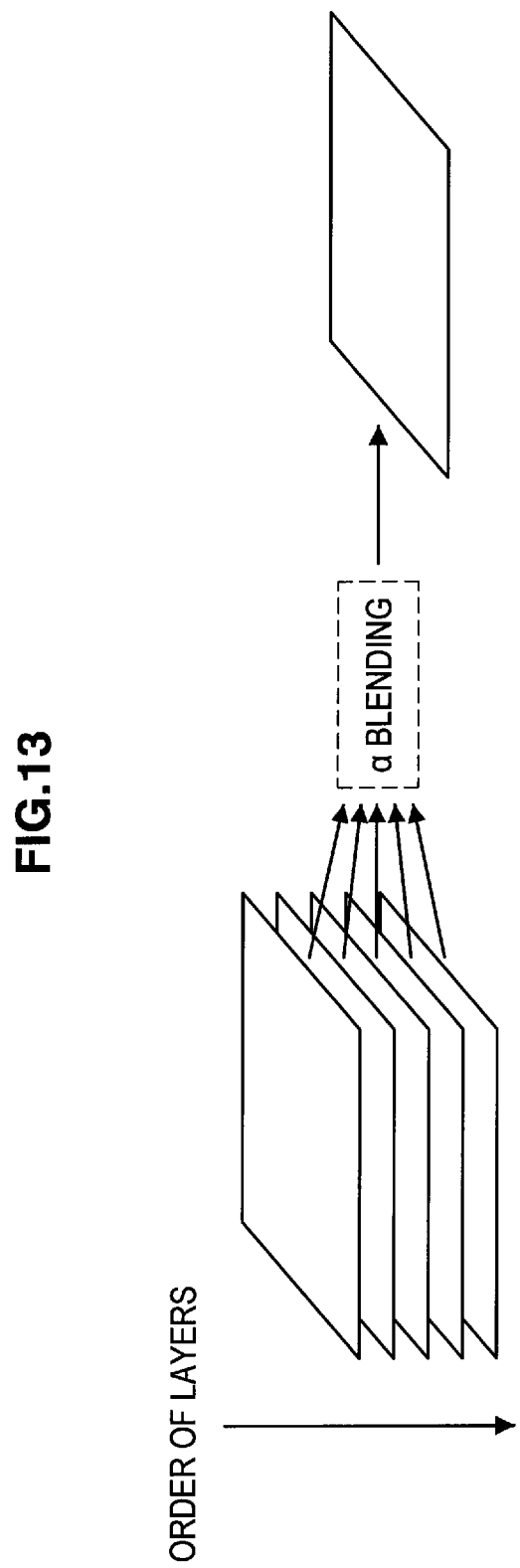
FIG. 13 is an explanatory diagram showing a layer multiplexing method according to the embodiment.

In the foregoing, the configuration of the image stabilization module 11 has been described in detail. A layer group input from the motion compensation unit 119 to the multiplexing unit 12 is alpha blended and multiplexed into one frame, as shown in FIG. 13. Incidentally, an alpha value (parameter indicating transparency amount) is set for each layer on a per-pixel basis or on a per-layer basis. Then, one frame obtained by the multiplexing unit 12 is displayed on the display unit 13.

In the forgoing, the functional configuration of the portable appliance 10 according to the present embodiment has been described.

[1-2: Operation of State Detection Unit 115]

Figure 2:
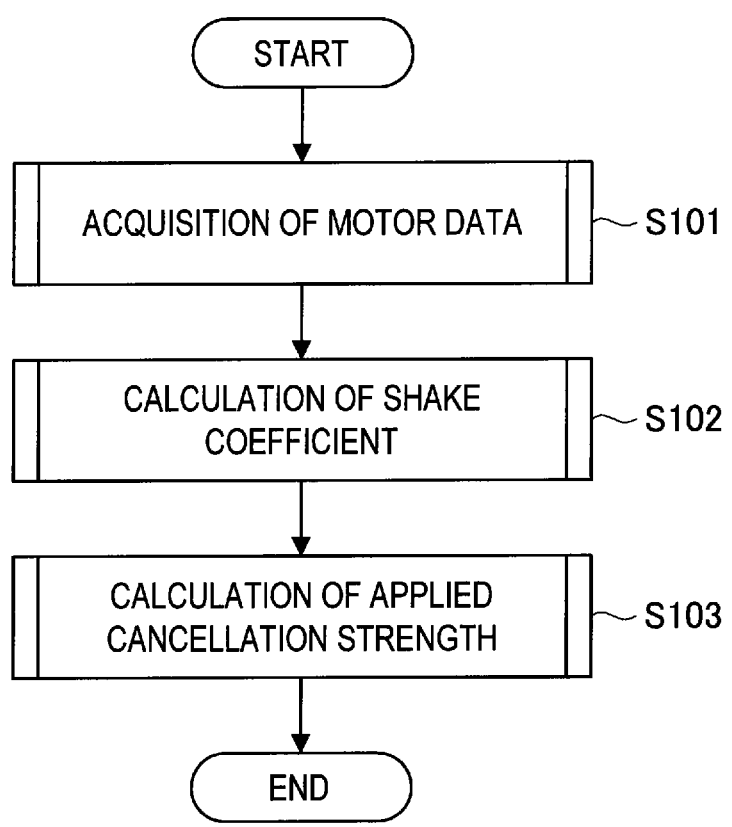
FIG. 2 is an explanatory diagram showing an operation of a state detection unit forming the portable appliance according to the embodiment.

Next, explanation regarding the operation of the state detection unit 115 will be supplemented with reference to FIG. 2. FIG. 2 is an explanatory diagram showing a flow of processes by the state detection unit 115.

(1-2-1: Flow of Processes)

As shown in FIG. 2, the state detection unit 112 acquires motion data from the FIFO buffer 114 (S101). Then, the state detection unit 115 calculates a shake coefficient based on the motion data acquired in step S101 (S102). Next, the state detection unit 115 calculates applied cancellation strength based on the shake coefficient calculated in step S102 (S103).

(1-2-2: Calculation Method of Shake Coefficient)

The calculation method of the shake coefficient s in step S102 will be described here. Additionally, it is assumed that motion data ($D_t, \ldots, D_{t+n}$) is acquired by the state detection unit 115 in step S101. The shake coefficient s is a numerical value expressing the intensity of motion expressed by the motion data ($D_t, \ldots, D_{t+n}$). The intensity of motion can be expressed by the strength of a high-frequency component. Thus, the state detection unit 115 Fourier transforms the motion data ($D_t, \ldots, D_{t+n}$) and calculates frequency data, and uses the amplitude of the high-frequency component. For example, the state detection unit 115 calculates a maximum amplitude value in a predetermined frequency domain, among the frequency data, as the shake coefficient s.

(1-2-3: Calculation Method of Applied Cancellation Strength)

Next, the calculation method of the applied cancellation strength in step S103 will be described.

(Case where Only Two States are Taken into Account)

As shown in FIG. 3, in the case of taking only two cases into account, namely a case where cancellation is to be applied and a case where cancellation is not to be applied, the state detection unit 115 calculates the applied cancellation strength based on comparison results between the shake coefficient s and two thresholds $T_1$ and $T_2$. Additionally, the applied cancellation strength is 1.0 in the case of a cancellation-applied state. On the other hand, the applied cancellation strength is 0.0 in the case of a non-cancellation-applied state.

As described above, in the case the shake coefficient s is large, the shaking of the portable appliance 10 is intense. In the case the shaking of the portable appliance 10 is intense, if image data is moved in a direction of cancelling the shaking, the shaking of the image data relative to a user's point of view is not reduced, but on the contrary, the shaking of the image data relative to the user's point of view is possibly increased, due to a delay resulting from computational processing or the like. Furthermore, if the image data is greatly moved, much of the image area will move out of the screen and a non-displayed area of the image data will be too large. Thus, cancellation of shaking is preferably not applied in the case the shaking of the portable appliance 10 is intense.

On the other hand, in the case the shake coefficient s is small, the shaking of the portable appliance 10 is slow. In the case the shaking of the portable appliance 10 is slow, a user can follow the motion of the image data without becoming tired. Thus, no cancellation is necessary in the case the shake coefficient s is small.

For the above reason, thresholds $T_1$ and $T_2$ are preferably determined as follows. For example, threshold $T_1$ is preferably determined such that the range of the shaking indicated by the shake coefficient s is about 1% of the screen size. That is, threshold $T_1$ is set such that the shaking of the image data relative to the user's point of view will be a negligible value. On the other hand, with respect to threshold $T_2$, the range of the shaking indicated by the shake coefficient s is about 10% of the screen size. That is, it is set to be a value according to which the effect of cancellation can be obtained and the non-displayed area is not too large in the case cancellation has been applied. Additionally, the numerical values of thresholds $T_1$ and $T_2$ are not limited to the examples described above. Also, thresholds $T_1$ and $T_2$ may be fixed values, or they may be variable.

(Case where Applied Cancellation Strength is Continuous Value)

Furthermore, a method of continuously determining the applied cancellation strength according to the shake coefficients s is also conceivable. For example, the applied cancellation strength can be defined by a real number between 0.0 to 1.0, as shown in FIG. 4. At this point, the non-cancellation-applied state is defined to be a state where the applied cancellation strength is 0.0. According to the characteristic curve of the applied cancellation strength illustrated in FIG. 4, the applied cancellation strength is increased or decreased smoothly together with the increase in the shake coefficient s. But the characteristic of the applied cancellation strength is not limited to such. For example, it may be a characteristic according to which the applied cancellation strength linearly increases from shake coefficient $s_1$, and after reaching applied cancellation strength of 1.0 at shake coefficient $s_2$ ($s_2 > s_1$), linearly decreases from shake coefficient $s_3$ ($s_3 > s_2$).

In the foregoing, an operation of the state detection unit 115 has been described.

[1-3: Operation of Filter Unit 117]

Figure 8:
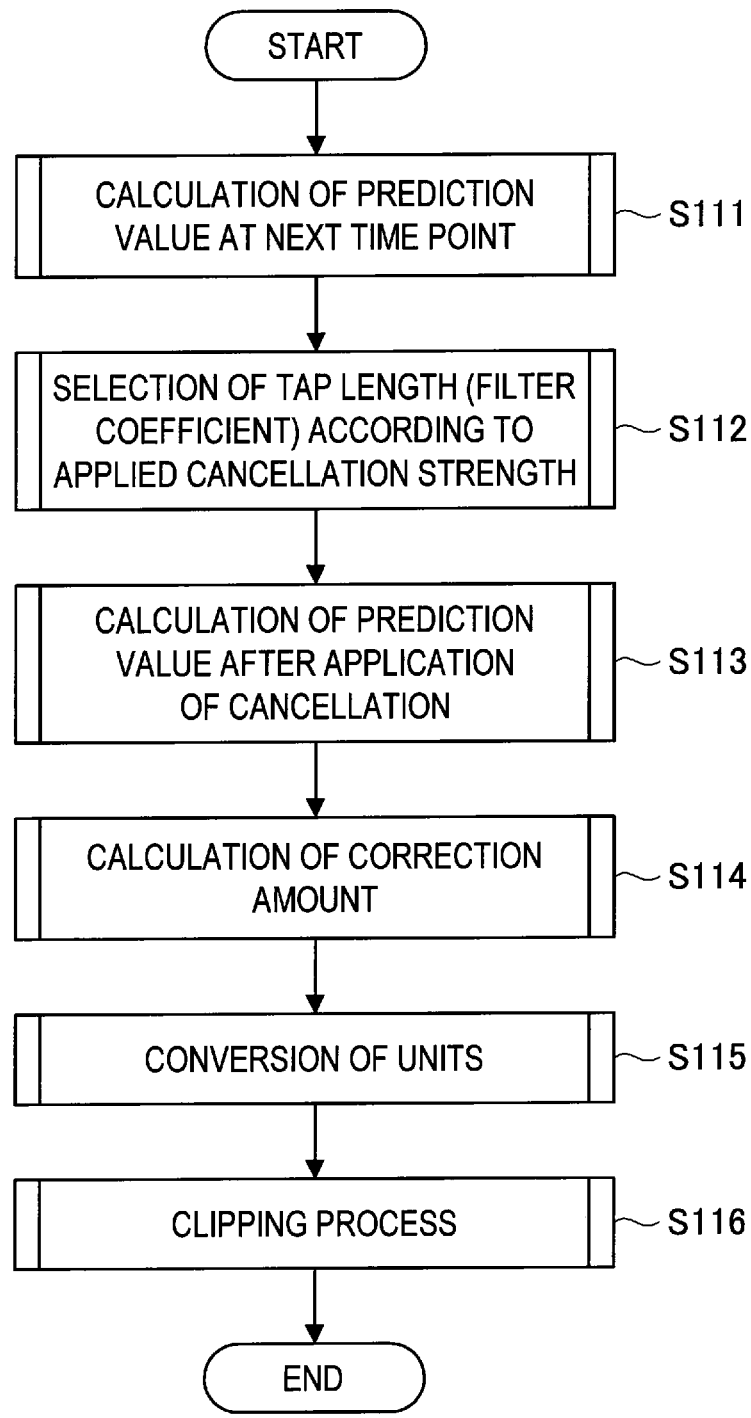
FIG. 8 is an explanatory diagram showing an operation of a filter unit forming the portable appliance according to the embodiment.

Next, explanation regarding the operation of the filter unit 117 will be supplemented with reference to FIG. 8. FIG. 8 is an explanatory diagram showing a flow of processes by the filter unit 117.

(1-3-1: Flow of Processes)

As shown in FIG. 8, the filter unit 117 predicts motion data (prediction value; see FIG. 9) at a display time point of a next frame based on the motion data read from the FIFO buffer 114 (S111). Then, the filter unit 117 selects a tap length according to the applied cancellation strength (S112). At this point, the filter unit 117 multiplies the applied cancellation strength by a weighting coefficient set for each use of a layer, and selects the tap length based on the multiplication result.

Next, the filter unit 117 applies motion data including the prediction value to a predetermined filter and calculates a prediction value after application of cancellation (S113). Then, the filter unit 117 deducts the prediction value before application of filter from the prediction value after application of cancellation and calculates a correction amount (see FIG. 10) (S114). Then, the filter unit 117 converts the unit of the correction amount from the unit of motion data (inch or the like) to the unit of image data (pixel) (S115).

Next, the filter unit 117 re-sets the correction amount based on a maximum screen movement amount (clipping process) (S116). For example, in the case the correction amount is above the maximum screen movement amount, the maximum screen movement amount is set to the new correction amount, and in the case the correction amount is not above the maximum screen movement amount, the correction amount calculated in step S114 is maintained.

(1-3-2: Calculation of Prediction Value)

The calculation method of the prediction value of step S111 will be described here.

As the calculation method of the prediction value, there is, for example, a linear prediction method using two adjacent samples ($D_{t+n-1}$, $D_{t+n}$), as shown in FIG. 9. According to this method, a straight line connecting the two adjacent samples ($D_{t+n-1}$, $D_{t+n}$) is extended, and motion data $D_{t+n+1}$ at the display time point t+n+1 of a next frame is predicted.

Furthermore, as the calculation method of the prediction value, a prediction method using a spline curve of motion data ($D_t$, . . . , $D_{t+n}$) is also conceivable, for example. According to this method, a spline curve based on the motion data ($D_t$, . . . , $D_{t+n}$) is calculated, and the motion data $D_{t+n+1}$ is predicted by extending the spline curve to the display time point t+n+1 of a next frame.

(1-3-3: Calculation of Correction Amount)

Next, the calculation method of the correction amount of steps S113 and S114 will be described.

At the time of calculating the correction amount, an interpolated line after filter application is first calculated as shown in FIG. 10. This interpolated line after filter application is an output value of a filter to which motion data ($D_t$, . . . , $D_{t+n}$ $D_{t+n+1}$) including the prediction value has been applied. The interpolated line after filter application corresponds to a shaking state where shaking of the image data relative to a user's point of view is suppressed. That is, the filter applied data at the display time point t+n+1 of the next frame corresponds to the prediction value of motion data which will be obtained after application of cancellation. Thus, the filter unit 117 which has obtained the filter applied data sets the difference between the filter applied data at the display time point t+n+1 of the next frame and prediction value $D_{t+n+1}$ as the correction amount.

In the foregoing, an operation of the filter unit 117 has been described.

[1-4: (Modified Example) Operation of Filter Unit 117]

Here, an operation of the filter unit 117 according to a modified example of the present embodiment will be described with reference to FIG. 14. FIG. 14 is an explanatory diagram showing a flow of processes performed by the filter unit 117 according to the modified example.

(1-4-1: Flow of Processes)

Figure 14:
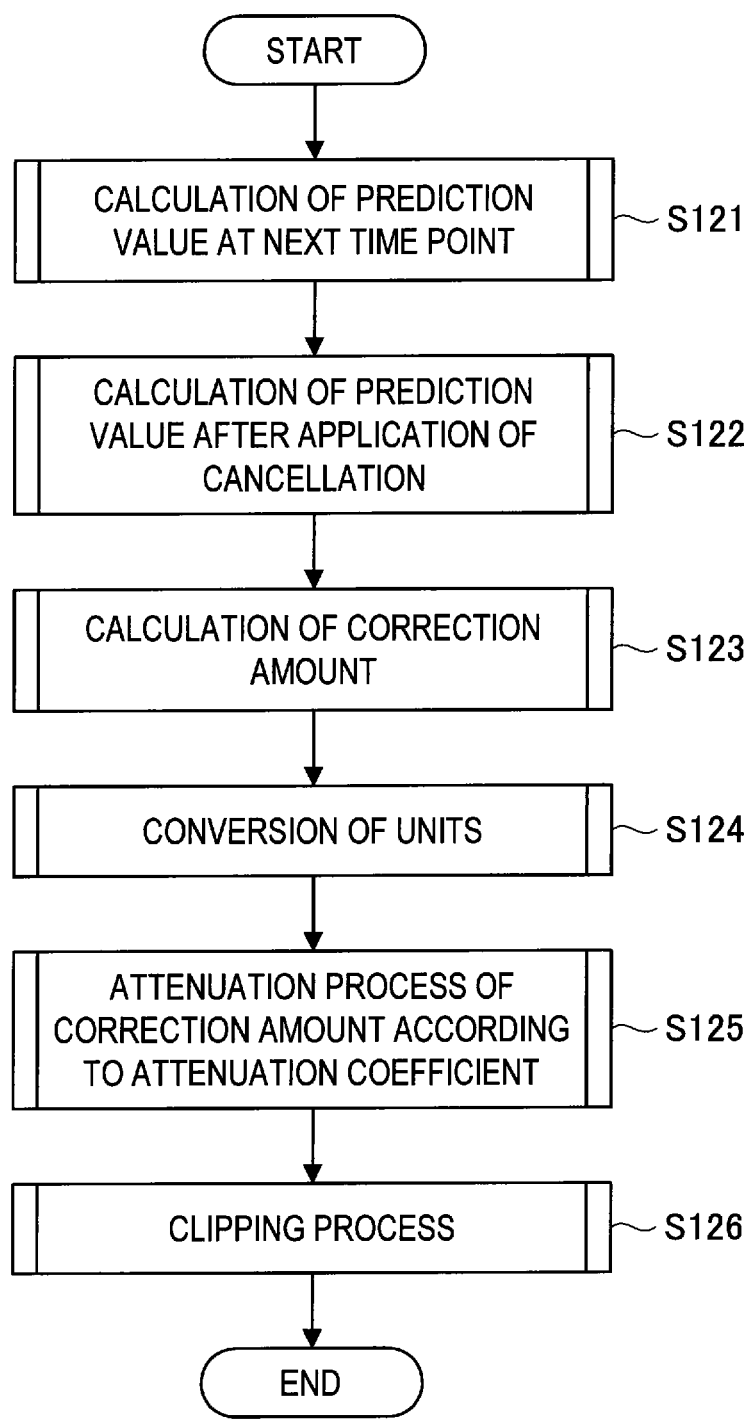
FIG. 14 is an explanatory diagram showing an operation (modified example) of the filter unit forming the portable appliance according to the embodiment.

As shown in FIG. 14, the filter unit 117 predicts motion data (prediction value; see FIG. 9) at a display time point of a next frame based on motion data read from the FIFO buffer 114 (S121). Next, the filter unit 117 applies motion data including the prediction value to a predetermined filter and calculates a prediction value after application of cancellation (S122). Then, the filter unit 117 deducts the prediction value before application of filter from the prediction value after application of cancellation and calculates a correction amount (see FIG. 10) (S123).

Then, the filter unit 117 converts the unit of the correction amount from the unit of motion data (inch or the like) to the unit of image data (pixel) (S124). Next, the filter unit 117 performs attenuation process of the correction amount according to an attenuation coefficient described later (S125). Next, the filter unit 117 re-sets the correction amount based on a maximum screen movement amount (clipping process) (S126). For example, in the case the correction amount is above the maximum screen movement amount, the maximum screen movement amount is set to the new correction amount, and in the case the correction amount is not above the maximum screen movement amount, the correction amount calculated in step S123 is maintained.

(1-4-2: Attenuation of Correction Amount)

Next, explanation regarding an attenuation process of the correction amount according to an attenuation coefficient in step S125 will be supplemented. As has been described, attribute information is associated with each layer. Also, in the example described above, a weighting coefficient is associated with each layer for each attribute. In the present modified example, an attenuation coefficient for adjusting the correction amount is introduced instead of the weighting coefficient for adjusting the applied cancellation strength. As shown in FIGS. 15 to 17, in the case of the present modified example, an attenuation coefficient is set in advance according to the type of attribute information, for example.

For example, as shown in FIG. 15, in the case the portable appliance 10 is a portable game machine, a layer whose use is for "game main screen" and a layer whose use is for "overlay such as scores" are included in the image data. In the case of the game main screen, it is considered that application of cancellation will contribute to the improvement of a user's view, and thus an attenuation coefficient of 1.0 is set in this case. The base correction amount (without weighting coefficient) is multiplied by this attenuation coefficient. Accordingly, cancellation is applied more strongly as the attenuation coefficient is larger. On the other hand, in the case of display of an overlay such as scores, it is considered that non-application of cancellation will contribute to the improvement of the user's view, and thus an attenuation coefficient of 0.0 is set in this case.

Furthermore, an operation button object is sometimes included. In this case, if an operation button moves relative to the portable appliance 10 due to application of cancellation, the operability is assumed to be reduced. Thus, as shown in FIG. 16, an attenuation coefficient of 0.0 is set for a layer whose use is for "operation button object," thereby preventing application of cancellation. Furthermore, in the case the portable appliance 10 is a terminal for displaying text, such as an eBookReader, it is considered that application of cancellation to a layer whose use is for "text display screen" will contribute to the improvement of the user's visibility. Thus, as shown in FIG. 17, an attenuation coefficient of 1.0 is set to the layer whose use is for the text display screen.

As described, by performing application control of cancellation according to the use of a layer, a user's operability or view can be improved. The attribute information of a layer and an attenuation coefficient according to each piece of attribute information are set in advance as illustrated in FIGS. 15 to 17, and the filter unit 117 multiplies the correction amount by the attenuation coefficient and inputs, to the correction vector generation unit 118, the multiplication result as the new correction amount. The application control of cancellation according to the use of a layer is realized by this processing.

In the foregoing, an operation of the filter unit 117 according to the present modified example has been described.

In the foregoing, the first embodiment has been described. A feature of the present embodiment lies in the method of calculating applied cancellation strength based on a shake coefficient s and performing cancellation of shaking based on the applied cancellation strength. By adopting this method, a user's fatigue can be reduced even if the portable appliance 10 is moved due to shaking of the hand or the like. Furthermore, a further feature of the present embodiment lies in performance of application control of cancellation according to the use of a layer. By adopting such a configuration, a user's operability or view can be improved according to displayed contents.

<2: Second Embodiment>

Next, a second embodiment will be described. The present embodiment relates to a method of adjusting applied cancellation strength on an operation object according to an operation status of a user.

[2-1: Functional Configuration of Portable Appliance 10]

First, a functional configuration of the portable appliance 10 according to the present embodiment will be described with reference to FIG. 18. FIG. 18 is an explanatory diagram showing a functional configuration of the portable appliance 10 according to the present embodiment. Additionally, structural elements that have substantially the same function as those of the portable appliance 10 according to the first embodiment above will be denoted with the same reference numerals, and detailed explanation of these structural elements will be omitted.

Figure 18:
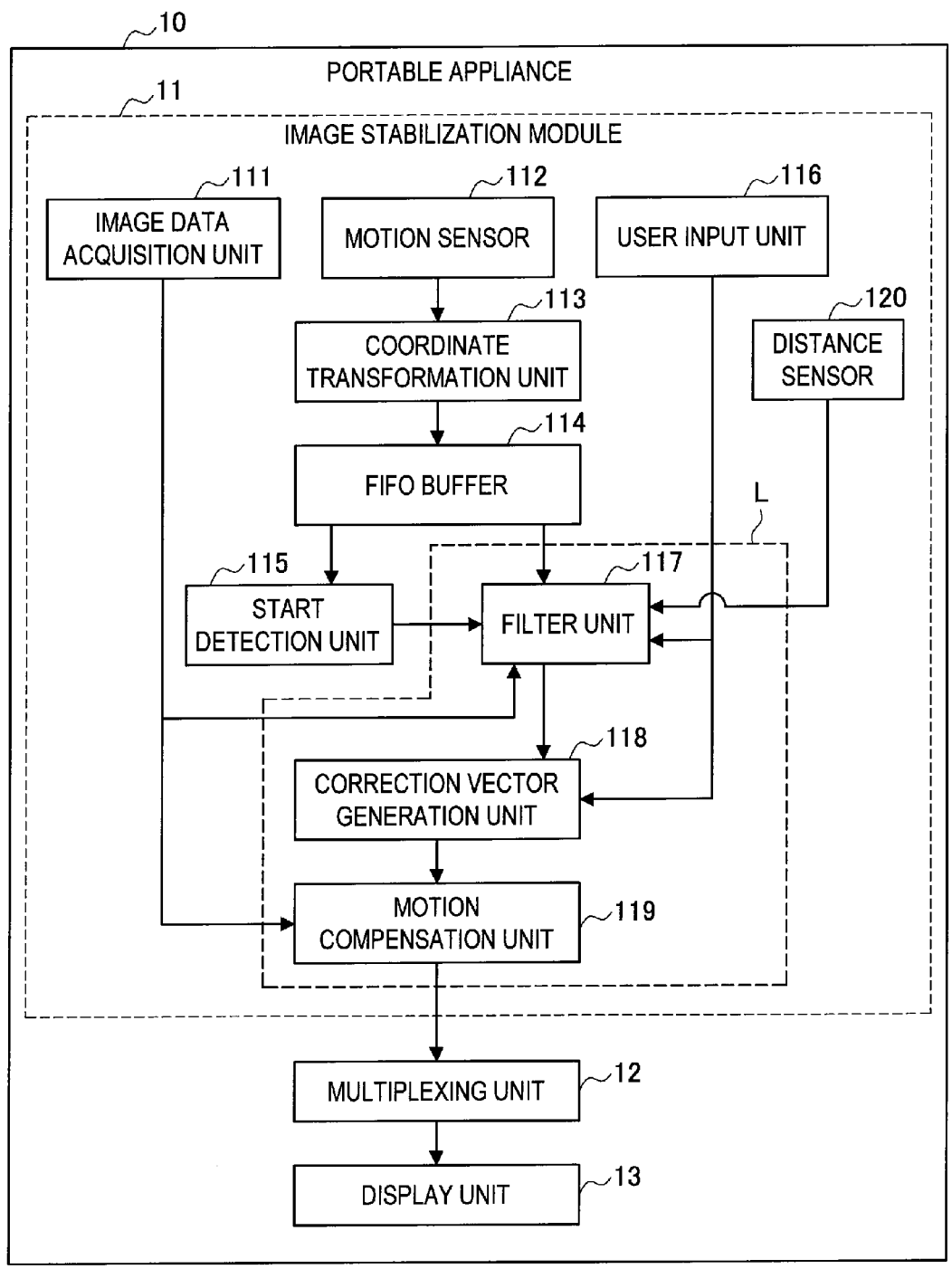
FIG. 18 is an explanatory diagram showing a functional configuration of a portable appliance according to a second embodiment.

As shown in FIG. 18, the portable appliance 10 mainly includes an image stabilization module 11, a multiplexing unit 12, and a display unit 13. The image stabilization module 11 is means for reducing shaking of a display image relative to a user's point of view. The multiplexing unit 12 is means for multiplexing a plurality of layers and creating a display image. The display unit 13 is means for displaying the display image created by the multiplexing unit 12. The feature of the portable appliance 10 according to the present embodiment lies mainly in the configuration of the image stabilization module 11. Thus, in the following, the configuration of the image stabilization module 11 will be described in greater detail.

As shown in FIG. 18, the image stabilization module 11 mainly includes an image data acquisition unit 111, a motion sensor 112, a coordinate transformation unit 113, a FIFO buffer 114, and a state detection unit 115. Furthermore, the image stabilization module 11 includes a user input unit 116, a filter unit 117, a correction vector generation unit 118, a motion compensation unit 119, and a distance sensor 120. The main difference to the image stabilization module 11 according to the first embodiment above lies in the presence of the distance sensor 120 and the function of the filter unit 117. Thus, functions of the distance sensor 120 and the filter unit 117 will be described in detail.

(Distance Sensor 120)

As shown in FIG. 19, the distance sensor 120 is means for detecting, in the case an operation tool 14 (for example, a user's finger or a stylus) nears the surface of the display unit 13, the distance between the operation tool 14 and the surface of the display unit 13. Such distance can be optically detected or can be detected based on the change in capacitance caused by the nearing of the operation tool 14, for example. The distance detected by the distance sensor 120 is input to the filter unit 117.

(Filter Unit 117)

As described above, the filter unit 117 selects a tap length of a filter according to applied cancellation strength calculated by the state detection unit 115, filter strength input via the user input unit 116, and a weighting coefficient set for each layer. Then, the filter unit 117 calculates a correction amount from filter applied data obtained by passing motion data through a filter having the selected tap length. Additionally, as with the modified example described above, a configuration is also possible where an attenuation process of a correction amount is performed according to the attenuation coefficient set for each layer. According to this configuration, control of applied cancellation strength according to the use of a layer is realized.

In the present embodiment, a method of controlling application strength of cancellation while taking into account the distance detected by the distance sensor 120 will be further considered. An operation object such as an operation button is preferably excluded from application targets of cancellation. This is because a user perceives the position of an operation object based on the position of the display unit 13 and tries to bring the operation tool 14 closer to the operation object. For example, as shown in FIG. 19, if, at the time the operation tool 14 is brought close to the surface of the display unit 13, the operation object is moved due to application of cancellation, a user has to make a movement so as to follow the motion of the operation object with the operation tool 14.

Figure 20:
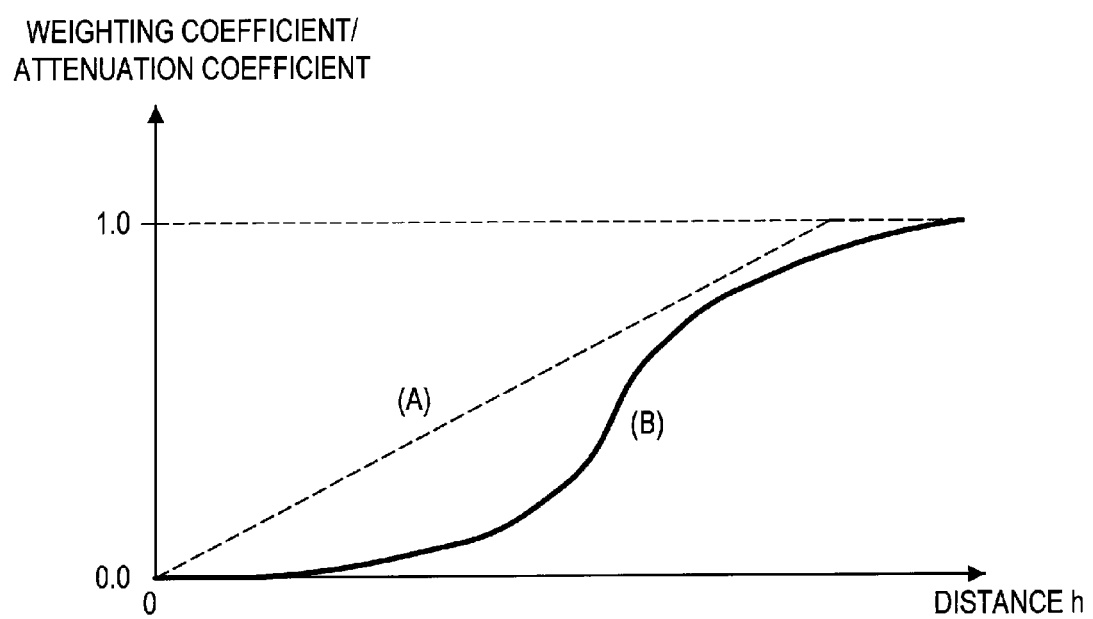
FIG. 20 is an explanatory diagram showing a shake cancelling method according to the embodiment.
Figure 21:
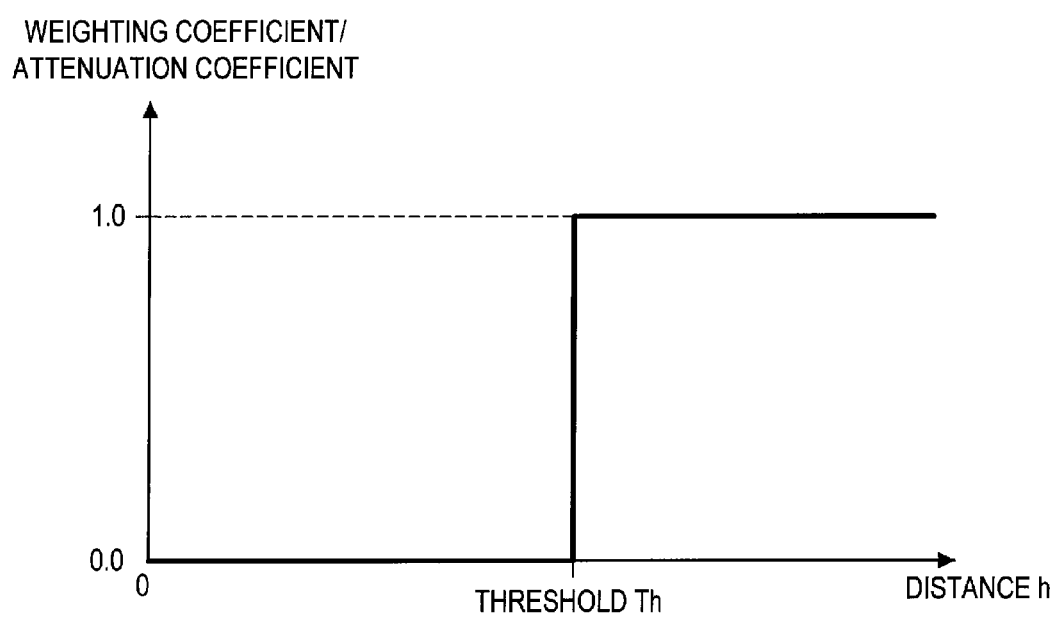
FIG. 21 is an explanatory diagram showing a shake cancelling method according to the embodiment.

Thus, taking the user's operability into account, the filter unit 117 performs control such that the applied cancellation strength or the correction amount of the layer including the operation object becomes smaller as distance h input by the distance sensor 120 becomes smaller. For example, as shown in FIG. 20, the filter unit 117 performs control such that the weighting coefficient or the attenuation coefficient becomes smaller as the distance h becomes smaller. According to the characteristic of (A), the applied cancellation strength or the correction amount becomes linearly small according to the distance h. According to the characteristic of (B), the applied cancellation strength or the correction amount becomes non-linearly small according to the distance h. Also, as shown in FIG. 21, a method of performing control such that application of cancellation is stopped at the time of the distance h falling below a certain threshold Th is also conceivable.

As described, the filter unit 117 according to the present embodiment has a function of controlling the applied cancellation strength according to the distance h between the operation tool 14 and the display unit 13. Having such a function enables to greatly improve a user's operability in the case of, for example, using a device, such as a touch panel, which is to be operated by using an operation object displayed on the display unit 13.

[2-2: Adjustment Method of Applied Cancellation Strength]

Here, an adjustment method of applied cancellation strength according to the present embodiment will be described with reference to FIGS. 19 to 21. As the adjustment method of applied cancellation strength, there are a method of adjusting a weighting coefficient and a method of adjusting an attenuation coefficient. In the following, each method will be described.

(Method of Adjusting Weighting Coefficient)

As with the first embodiment described above, a user's operability can be improved by setting a weighting coefficient corresponding to the layer including the operation object to 0.0 and not applying cancellation to the layer. However, if cancellation is not applied, a user's view of displayed contents included in the layer will be poor. For example, the visibility of letters displayed on an operation button will be poor. Thus, it would be adequate that control is performed, not to not apply cancellation to the layer including the operation object at all times, but to not apply cancellation, at the time of operation of a user, to the layer including the operation object which is the operation target.

As has been described, a weighting coefficient is a parameter by which applied cancellation strength calculated by the state detection unit 115 is multiplied. Also, the applied cancellation strength is used at the time of selecting the tap length (corresponding to the strength of cancellation) of a filter. Thus, the strength of cancellation can be adjusted by adjusting the weighting coefficient according to the distance h detected by the distance sensor 120. For example, the weighting coefficient is set to be smaller as the distance h becomes less, as shown in FIG. 20. According to such setting, the strength of cancellation on the layer including the operation object becomes weaker as the operation tool 14 is brought closer to the display unit 13. Additionally, the relationship between the weighting coefficient and the distance h may be set as shown in FIG. 21.

(Method of Adjusting Attenuation Coefficient)

Similarly to the case of adjusting the weighting coefficient, the strength of cancellation can be adjusted according to the distance h by adjusting an attenuation coefficient. As has been described, a correction amount indicating the strength of cancellation is multiplied by the attenuation coefficient. That is, the strength of cancellation on the layer including the operation object becomes weaker as the operation tool 14 is brought closer to the display unit 13. For example, the attenuation coefficient is set to be smaller as the distance h becomes less, as shown in FIG. 20. Also, the relationship between the attenuation coefficient and the distance h may be set as shown in FIG. 21.

By using such a method, a user's view and operability can be improved in the case of, for example, using a device, such as a touch panel, which is to be operated by using an operation object displayed on the display unit 13.

In the foregoing, the second embodiment has been described.

<3: Third Embodiment>

Next, a third embodiment will be described. The present embodiment relates to a method of determining filter strength according to the depth of the perspective (depth) of a three-dimensional virtual space.

[3-1: Functional Configuration of Portable Appliance 10]

Figure 22:
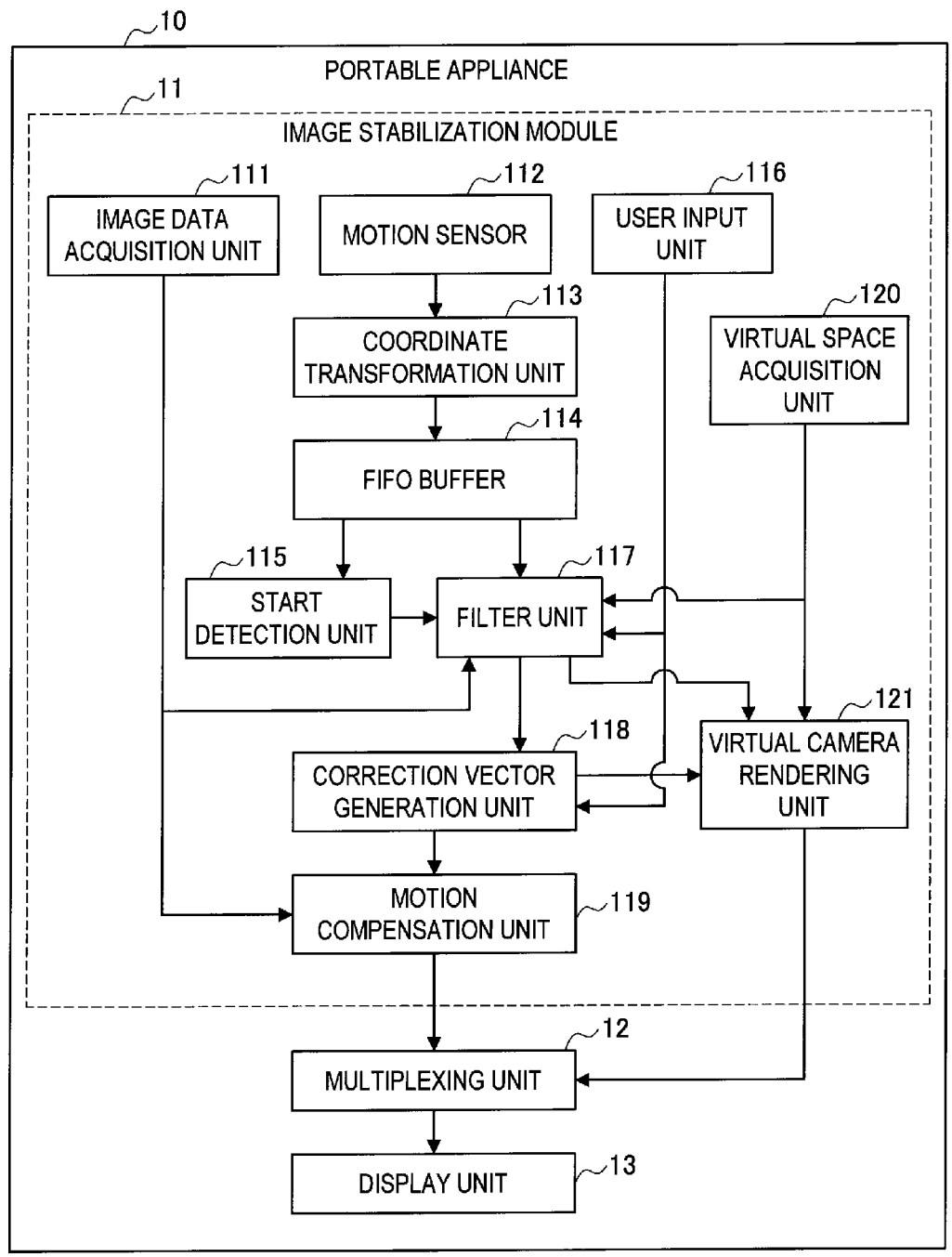
FIG. 22 is an explanatory diagram showing a functional configuration of a portable appliance according to a third embodiment.

First, a functional configuration of a portable appliance 10 according to the present embodiment will be described with reference to FIG. 22. FIG. 22 is an explanatory diagram showing a functional configuration of a portable appliance 10 according to the present embodiment. Additionally, structural elements that have substantially the same function as those of the portable appliance 10 according to the first embodiment above will be denoted with the same reference numerals, and detailed explanation of these structural elements will be omitted.

As shown in FIG. 22, the portable appliance 10 mainly includes an image stabilization module 11, a multiplexing unit 12, and a display unit 13. The image stabilization module 11 is means for reducing shaking of a display image relative to a user's point of view. The multiplexing unit 12 is means for multiplexing a plurality of layers and creating a display image. The display unit 13 is means for displaying the display image created by the multiplexing unit 12. The feature of the portable appliance 10 according to the present embodiment lies mainly in the configuration of the image stabilization module 11. Thus, in the following, the configuration of the image stabilization module 11 will be described in greater detail.

As shown in FIG. 22, the image stabilization module 11 mainly includes an image data acquisition unit 111, a motion sensor 112, a coordinate transformation unit 113, a FIFO buffer 114, and a state detection unit 115. Furthermore, the image stabilization module 11 includes a user input unit 116, a filter unit 117, a correction vector generation unit 118, a motion compensation unit 119, a virtual space acquisition unit 121, and a virtual camera rendering unit 122. The main difference to the image stabilization module 11 according to the first embodiment above lies in the presence of the virtual space acquisition unit 121 and the virtual camera rendering unit 122. Furthermore, the presence of these changes the functions of the filter unit 117 and the correction vector generation unit 118.

In the case a scene drawn by 3DCG is included as a rendering target, in addition to a group of two-dimensional plane frames acquired by the image data acquisition unit 111, the virtual space acquisition unit 121 acquires data of the scene drawn by 3DCG (hereinafter, 3D data). Then, the 3D data acquired by the virtual space acquisition unit 121 is input to the virtual camera rendering unit 122 and the filter unit 117. The filter unit 117 calculates a correction amount for the position and angle of a virtual camera shooting the three-dimensional virtual space, based on the 3D data acquired by the virtual space acquisition unit 121. Then, the correction amount calculated by the filter unit 117 is input to the correction vector generation unit 118.

When the correction amount is input by the filter unit 117, the correction vector generation unit 118 calculates a correction matrix V for the group of two-dimensional plane frames, and also, generates a view matrix based on the correction amount for the position and angle of the virtual camera. The view matrix generated by the correction vector generation unit 118 is input to the virtual camera rendering unit 122. The virtual camera rendering unit 122 uses the view matrix input by the correction vector generation unit 118, and renders the 3D data input by the virtual space acquisition unit 121. Then, the result of rendering by the virtual camera rendering unit 122 is input to the multiplexing unit 12.

In the foregoing, a functional configuration of the portable appliance 10 has been described.

[3-2: Adjustment Method of Correction Amount]

Here, a method of adjusting a correction amount relating to the position and angle of a virtual camera by the filter unit 117 will be described with reference to FIGS. 23 to 27. As described above, in the case of the 3DCG, rendered image data is not corrected, but the position and angle of a virtual camera is taken as the correction target before rendering. Then, when the view of the three-dimensional space captured by the virtual camera is rendered as a two-dimensional image by rendering unit 122, this rendered image data may be combined with other two-dimensional image layers by the multiplexing unit 12. Thus, one or more of the layers multiplexed to create a display image may represent the three-dimensional space rendered to produce that layer. Additionally, in the case of correcting the rendered image data, the rendered image data may be taken as one plane layer and may be corrected after rendering, by the same method as that of the first embodiment described above.

Figure 23:
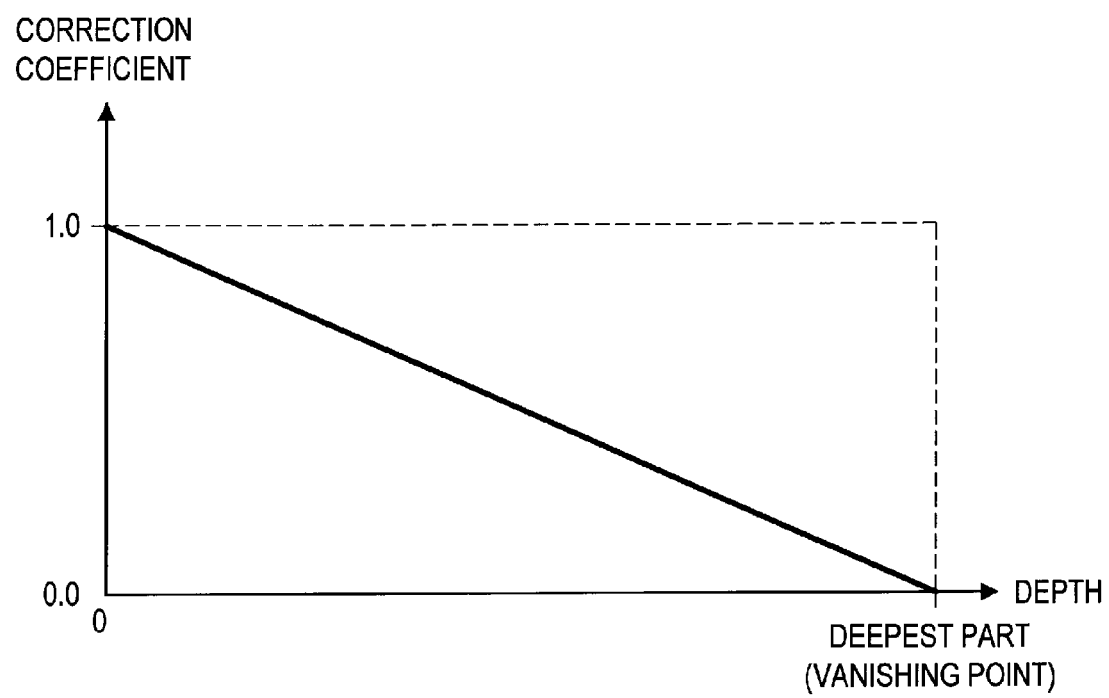
FIG. 23 is an explanatory diagram showing a shake cancelling method according to the embodiment.
Figure 24:
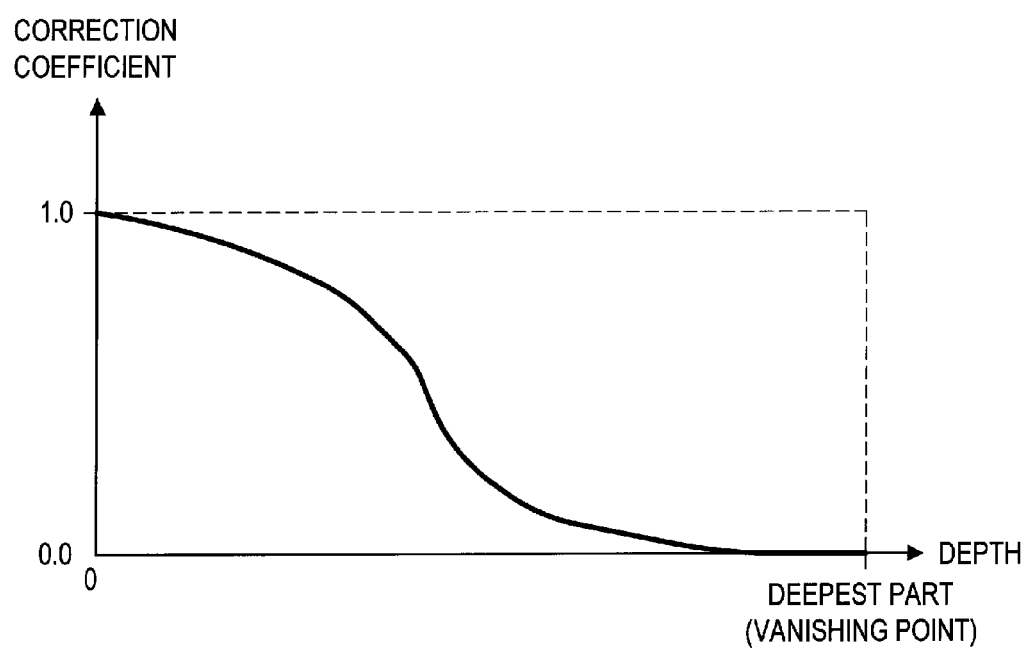
FIG. 24 is an explanatory diagram showing a shake cancelling method according to the embodiment.
Figure 25:
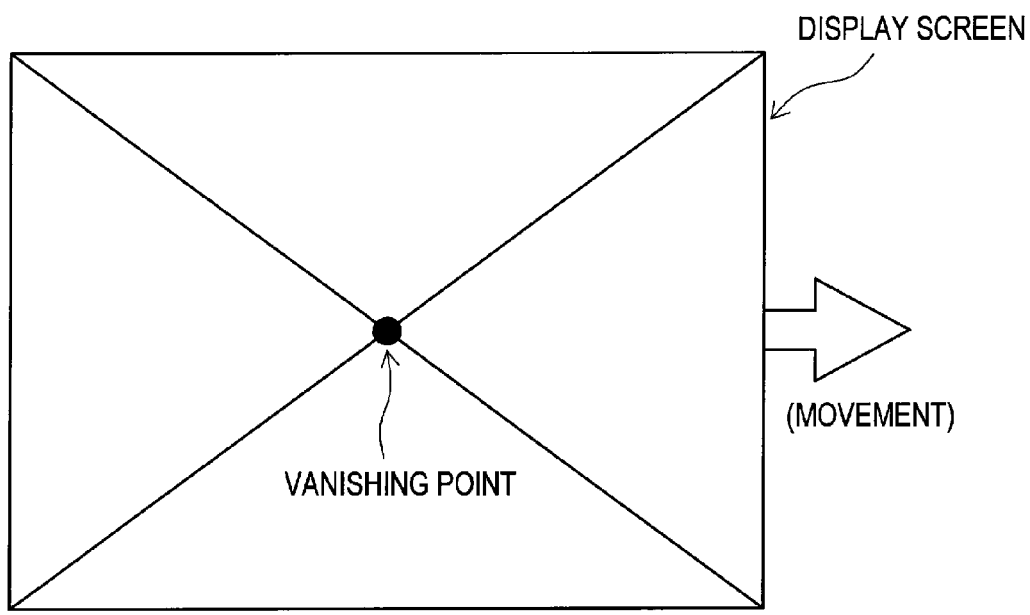
FIG. 25 is an explanatory diagram showing a shake cancelling method according to the embodiment.
Figure 26:
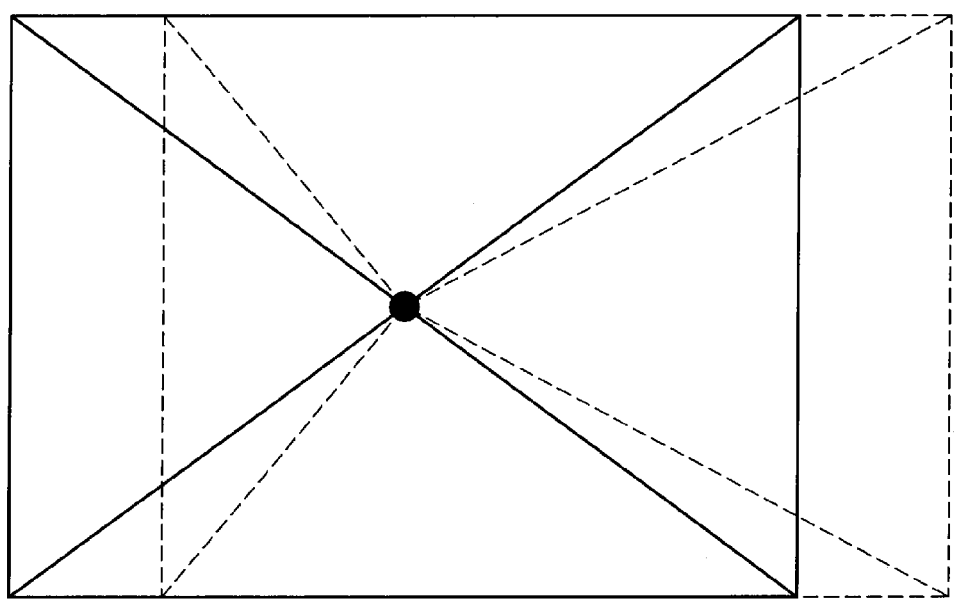
FIG. 26 is an explanatory diagram showing a shake cancelling method according to the embodiment.

Now, the correction amount of the position and angle of a virtual camera is adjusted according to the distance in the perspective direction (hereinafter, depth) of the virtual space. For example, as shown in FIG. 23, a correction coefficient is made to be smaller as the depth becomes greater. Here, the correction coefficient is a parameter by which the correction amount is multiplied. That is, the correction amount becomes larger and the strength of cancellation becomes greater as the correction coefficient becomes larger. In the examples of FIGS. 23 and 24, the correction coefficient becomes smaller as the depth becomes greater, and when the deepest part (vanishing point of the virtual space) is reached, the correction coefficient becomes 0.0. That is, this example is a method according to which, even if the portable appliance 10 is moved as shown in FIG. 25, the vanishing point stays still relative to a user's point of view, as shown in FIG. 26.

Figure 27:
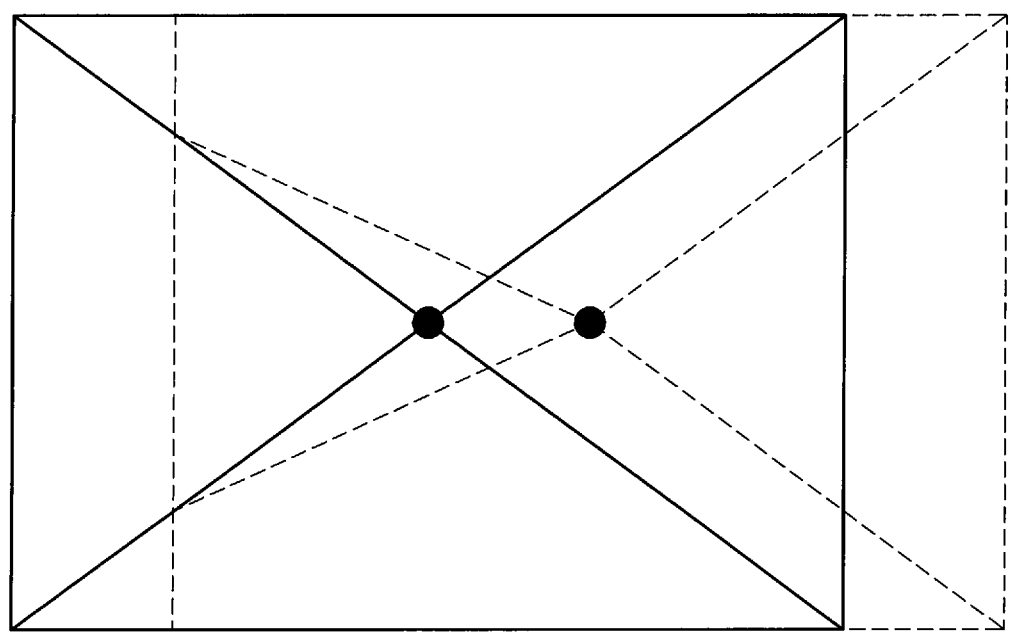
FIG. 27 is an explanatory diagram showing a shake cancelling method according to the embodiment.

For example, in the case of a game where the vanishing point is set at infinity, such as a racing game, it is desirable that there is no motion, at infinity, relative to a user's point of view. In such a case, the vanishing point corresponding to the infinity can be made still relative to the user's point of view by setting the characteristic of the correction coefficient as shown in FIG. 24. Additionally, with the settings shown in FIGS. 23 and 24, a realistic feeling of the three-dimensional virtual space is emphasized, and a deep impression of a 3D effect can be given to the user. Additionally, as shown in FIG. 27, there is also a method of making the foremost screen for which the depth is the smallest still relative to the user's point of view and applying the strongest cancellation to the vanishing point. Such a method can also be adopted as appropriate according to the mode of embodiment.

In the foregoing, the third embodiment has been described.

<4: Hardware Configuration>

Figure 28:
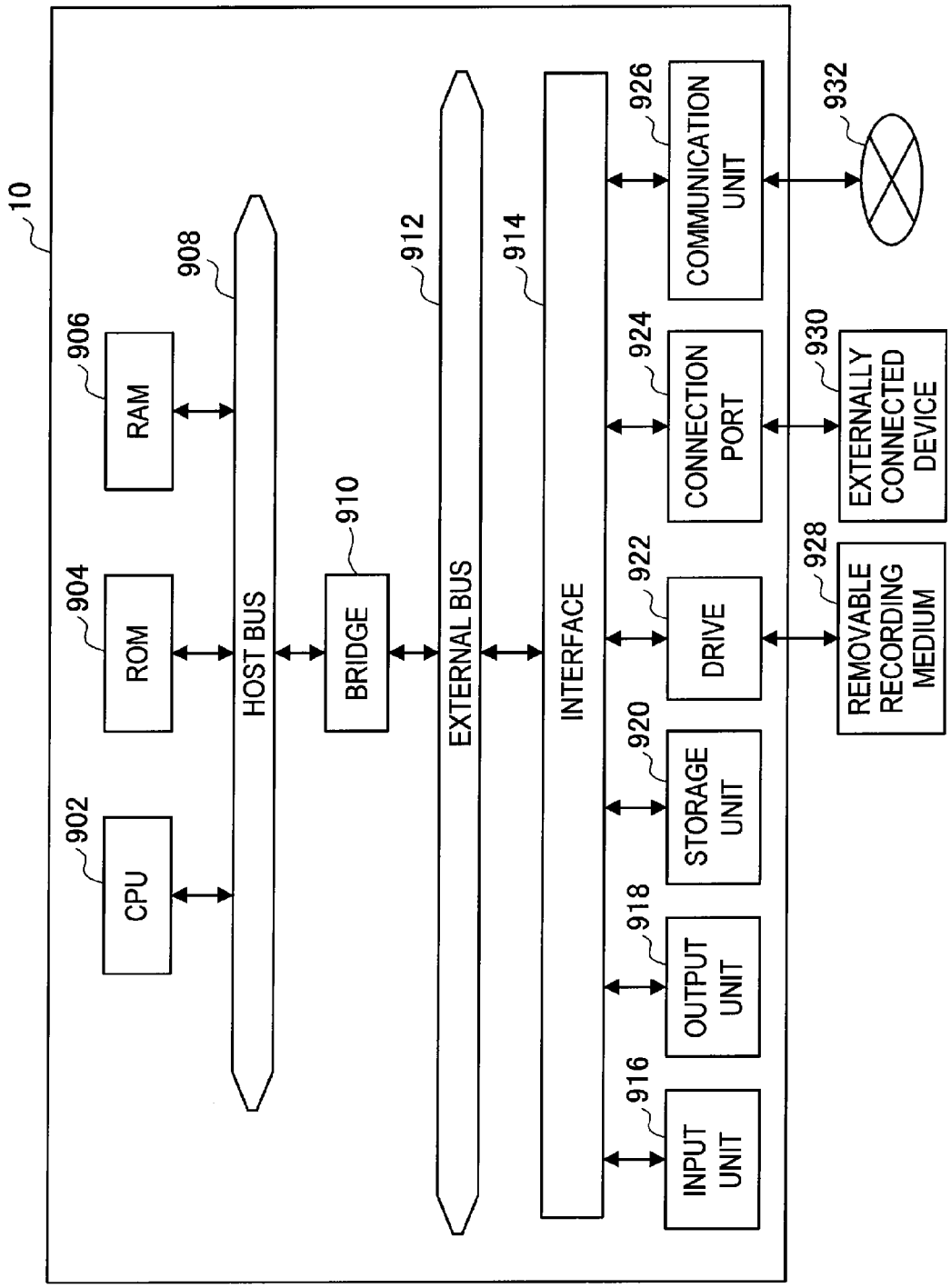
FIG. 28 is an explanatory diagram showing a hardware configuration capable of realizing functions of the portable appliances according to the first to third embodiments.

The function of each structural element of the portable appliance 10 described above can be realized by using, for example, the hardware configuration of an information processing apparatus illustrated in FIG. 28. That is, the function of each structural element can be realized by controlling the hardware shown in FIG. 28 using a computer program. Additionally, the mode of this hardware is arbitrary, and may be a personal computer, a mobile information terminal such as a mobile phone, a PHS or a PDA, a game machine, or various types of information appliances. Moreover, the PHS is an abbreviation for Personal Handy-phone System. Also, the PDA is an abbreviation for Personal Digital Assistant.

As shown in FIG. 28, this hardware mainly includes a CPU 902, a ROM 904, a RAM 906, a host bus 908, and a bridge 910. Furthermore, this hardware includes an external bus 912, an interface 914, an input unit 916, an output unit 918, a storage unit 920, a drive 922, a connection port 924, and a communication unit 926. Moreover, the CPU is an abbreviation for Central Processing Unit. Also, the ROM is an abbreviation for Read Only Memory. Furthermore, the RAM is an abbreviation for Random Access Memory.

The CPU 902 functions as an arithmetic processing unit or a control unit, for example, and controls entire operation or a part of the operation of each structural element based on various programs recorded on the ROM 904, the RAM 906, the storage unit 920, or a removal recording medium 928. The ROM 904 is means for storing, for example, a program to be loaded on the CPU 902 or data or the like used in an arithmetic operation. The RAM 906 temporarily or perpetually stores, for example, a program to be loaded on the CPU 902 or various parameters or the like arbitrarily changed in execution of the program.

These structural elements are connected to each other by, for example, the host bus 908 capable of performing high-speed data transmission. For its part, the host bus 908 is connected through the bridge 910 to the external bus 912 whose data transmission speed is relatively low, for example. Furthermore, the input unit 916 is, for example, a mouse, a keyboard, a touch panel, a button, a switch, or a lever. Also, the input unit 916 may be a remote control that can transmit a control signal by using an infrared ray or other radio waves.

The output unit 918 is, for example, a display device such as a CRT, an LCD, a PDP or an ELD, an audio output device such as a speaker or headphones, a printer, a mobile phone, or a facsimile, that can visually or auditorily notify a user of acquired information. Moreover, the CRT is an abbreviation for Cathode Ray Tube. The LCD is an abbreviation for Liquid Crystal Display. The PDP is an abbreviation for Plasma Display Panel. Also, the ELD is an abbreviation for Electro-Luminescence Display.

The storage unit 920 is a device for storing various data. The storage unit 920 is, for example, a magnetic storage device such as a hard disk drive (HDD), a semiconductor storage device, an optical storage device, or a magneto-optical storage device. The HDD is an abbreviation for Hard Disk Drive.

The drive 922 is a device that reads information recorded on the removal recording medium 928 such as a magnetic disk, an optical disk, a magneto-optical disk, or a semiconductor memory, or writes information in the removal recording medium 928. The removal recording medium 928 is, for example, a DVD medium, a Blu-ray medium, an HD-DVD medium, various types of semiconductor storage media, or the like. Of course, the removal recording medium 928 may be, for example, an electronic device or an IC card on which a non-contact IC chip is mounted. The IC is an abbreviation for Integrated Circuit.

The connection port 924 is a port such as an USB port, an IEEE1394 port, a SCSI, an RS-232C port, or a port for connecting an externally connected device 930 such as an optical audio terminal. The externally connected device 930 is, for example, a printer, a mobile music player, a digital camera, a digital video camera, or an IC recorder. Moreover, the USB is an abbreviation for Universal Serial Bus. Also, the SCSI is an abbreviation for Small Computer System Interface.

The communication unit 926 is a communication device to be connected to a network 932, and is, for example, a communication card for a wired or wireless LAN, Bluetooth (registered trademark), or WUSB, an optical communication router, an ADSL router, or various communication modems. The network 932 connected to the communication unit 926 is configured from a wire-connected or wirelessly connected network, and is the Internet, a home-use LAN, infrared communication, visible light communication, broadcasting, or satellite communication, for example. Moreover, the LAN is an abbreviation for Local Area Network. Also, the WUSB is an abbreviation for Wireless USB. Furthermore, the ADSL is an abbreviation for Asymmetric Digital Subscriber Line.

<5: Summary>

The technical contents stated here can be applied to various information processing apparatuses, such as a personal computer, a mobile phone, a portable game machine, a portable information terminal, an information appliance, a car navigation system, and the like.

The functional configuration of the information processing apparatus described above can be expressed as follows. The information processing apparatus is configured from a shake sensor, an image data acquisition unit, an image data display unit, and a motion correction unit described below. The shake sensor is for detecting shaking from time series motion data. Furthermore, the image data acquisition unit is for acquiring image data formed from a plurality of layers. Furthermore, the image data display unit is for displaying the image data acquired by the image data acquisition unit.

Furthermore, the motion correction unit is for performing control on the image data acquisition unit, according to a degree in accordance with a type of each layer forming the image data, to move the each layer in a direction of cancelling the shaking detected by the shake sensor. For example, the motion correction unit decreases the cancellation strength for a layer including an operation object and increases the cancellation strength for a layer including a main screen. By changing the strength of cancellation according to the type of a layer as above, a user's view and operability can be made compatible with each other.

(Notes)

The state detection unit 115, the filter unit 117, the correction vector generation unit 118, and the motion compensation unit 119 are examples of a motion correction unit. Also, the distance sensor 120 is an example of a touch sensor. The image stabilization module 11 is an example of an image stabilization apparatus.

Some embodiments may comprise a computer-readable storage medium (or multiple computer-readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage media) encoded with one or more programs (e.g., a plurality of instructions) that, when executed on one or more computers or other processors, perform methods that implement the various embodiments discussed above. As is apparent from the foregoing examples, a computer-readable storage medium may retain information for a sufficient time to provide computer-executable instructions in a non-transitory form.

It should be understood by those skilled in the art that various modifications, combinations, sub-combinations and alterations may occur depending on design requirements and other factors insofar as they are within the scope of the appended claims or the equivalents thereof.

Use of ordinal terms such as "first," "second," "third," etc., in the claims to modify a claim element does not by itself connote any priority, precedence, or order of one claim element over another or the temporal order in which acts of a method are performed. Such ordinal terms are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. An information processing apparatus, comprising:
   a Central Processing Unit (CPU) configured to:
   display an image data, wherein said displayed image data comprises one or more frames, wherein each of said one or more frames comprises a plurality of layers; and
   process said plurality of layers to correct motion of said information processing apparatus by applying a different degree of motion correction to each of said plurality of layers based on an attribute information of each of said plurality of layers, wherein said attribute information of a layer of said plurality of layers indicates a type of said layer.

2. The information processing apparatus according to claim 1, wherein said attribute information of said layer of said plurality of layers indicates a use of said layer.

3. The information processing apparatus according to claim 1, further comprising a motion sensor configured to:
   detect said motion of said information processing apparatus; and
   output a motion data based on said detected motion of said information processing apparatus.

4. The information processing apparatus according to claim 3, wherein said CPU is configured to:
   determine a correction amount for moving each of said plurality of layers in a direction opposing said detected motion of said information processing apparatus, wherein said correction amount determined for each of said plurality of layers is different; and
   move each of said plurality of layers in said direction opposing said detected motion of said information processing apparatus based on said correction amount determined for each of said plurality of layers.

5. The information processing apparatus according to claim 4, wherein said CPU is configured to:
   calculate a maximum screen movement amount based on a distance between a boundary of a protected area set for said image data and a position of a frame of said one or more frames; and
   re-set said correction amount based on said calculated maximum screen movement amount.

6. The information processing apparatus according to claim 3, wherein said CPU is configured to:
   calculate a shake coefficient indicating intensity of said detected motion of said information processing apparatus; and
   calculate a cancellation strength value for each of said plurality of layers based on a comparison between said shake coefficient, and a first threshold value and a second threshold value.

7. The information processing apparatus according to claim 6, wherein said first threshold value and said second threshold value are determined based on a screen size of said information processing apparatus.

8. The information processing apparatus according to claim 6, wherein said CPU is configured to:
   apply a filter to said motion data and a prediction value determined based on said motion data for each of said plurality of layers; and
   determine a correction amount for each of said plurality of layers based on said filtered motion data and said filtered prediction value.

9. The information processing apparatus according to claim 8, wherein said CPU is configured to adjust a tap length of said filter applied to each of said plurality of layers based on said cancellation strength value for each of said plurality of layers.

10. The information processing apparatus according to claim 8, wherein said CPU is configured to adjust a tap length of said filter applied to each of said plurality of layers based on said attribute information for each of said plurality of layers.

11. The information processing apparatus according to claim 1, wherein said CPU is configured to:
  determine a base correction amount for a frame of said one or more frames; and
  determine a correction amount for each layer of said frame by adjusting said determined base correction amount by an attenuation coefficient for each layer of said frame, wherein said attenuation coefficient of each layer of said frame is determined based on said attribute information of each layer.

12. The information processing apparatus according to claim 1, wherein said CPU is configured to apply a different degree of motion correction to each of a main screen type layer and an overlay type layer, wherein said degree of motion correction applied to said main screen type layer is greater than said degree of motion correction applied to said overlay type layer.

13. The information processing apparatus according to claim 12, wherein said main screen type layer comprises a text display screen or a game main screen, and wherein said overlay type layer comprises a display of scores.

14. The information processing apparatus according to claim 1, wherein said CPU is configured to apply no motion correction to a layer of said plurality of layers whose use is for an operation object.

15. The information processing apparatus according to claim 1, further comprises:
  a display unit configured to display said image data; and
  a distance sensor configured to detect a distance between an operation tool and said display unit,
  wherein said CPU is configured to adjust a degree of motion correction applied to a layer of said plurality of layers that includes an operation object, based on said detected distance.

16. The information processing apparatus according to claim 15, wherein said CPU is configured to decrease said degree of motion correction applied to said layer that includes said operation object as said detected distance decreases.

17. The information processing apparatus according to claim 1, wherein said CPU is configured to:
  calculate a correction amount for a position and/or an angle of a virtual camera shooting a three-dimensional virtual space, wherein a layer of said plurality of layers represents said three-dimensional virtual space; and
  adjust said correction amount for said position and/or an angle of said virtual camera based on a depth of said three-dimensional virtual space to correct for said motion of said information processing apparatus.

18. The information processing apparatus according to claim 17, wherein said CPU is configured to decrease said correction amount for said position and/or angle of said virtual camera as said depth of said three-dimensional virtual space increases.

19. An information processing method, comprising;
  detecting motion of an information processing apparatus configured to display an image data, wherein said image data comprises one or more frames, wherein each of said one or more frames comprises a plurality of layers; and
  processing said plurality of layers to correct said detected motion of said information processing apparatus by applying a different degree of motion correction to each of said plurality of layers and based on an attribute information of said each of said plurality of layers, wherein said attribute information of a layer of said plurality of layers indicates a type of said layer.

20. A non-transitory computer-readable storage medium having stored thereon, a plurality of computer-executable instructions that, when executed by a computer cause said computer to perform steps comprising:
  detecting motion of an information processing apparatus configured to display an image data, wherein said image data comprises one or more frames, wherein each of said one or more frames comprises a plurality of layers; and
  processing said plurality of layers to correct said detected motion of said information processing apparatus by applying a different degree of motion correction to each of said plurality of layers based on an attribute information of each of said plurality of layers, wherein said attribute information of a layer of said plurality of layers indicates a type of said layer.

* * * * *